US011416944B1

(12) United States Patent
Floyd

(10) Patent No.: US 11,416,944 B1
(45) Date of Patent: Aug. 16, 2022

(54) BLOCKCHAIN-BASED SYSTEMS AND METHODS FOR SELF-MANAGED PEER GROUP INSURANCE

(71) Applicant: State Farm Mutual Automobile Insurance Company, Bloomington, IL (US)

(72) Inventor: Matthew Lewis Floyd, Alpharetta, GA (US)

(73) Assignee: STATE FARM MUTUAL AUTOMOBILE INSURANCE COMPANY, Bloomington, IL (US)

( * ) Notice: Subject to any disclaimer, the term of this patent is extended or adjusted under 35 U.S.C. 154(b) by 485 days.

(21) Appl. No.: 16/460,486

(22) Filed: Jul. 2, 2019

Related U.S. Application Data

(60) Provisional application No. 62/757,558, filed on Nov. 8, 2018, provisional application No. 62/733,499, filed on Sep. 19, 2018.

(51) Int. Cl.
*G06Q 40/08* (2012.01)
*G06Q 20/36* (2012.01)
*G06F 16/27* (2019.01)

(52) U.S. Cl.
CPC ............ *G06Q 40/08* (2013.01); *G06F 16/27* (2019.01); *G06Q 20/363* (2013.01)

(58) Field of Classification Search
CPC ....... G06Q 40/08; G06Q 20/363; G06F 16/27
See application file for complete search history.

(56) References Cited

U.S. PATENT DOCUMENTS

| | | | |
|---|---|---|---|
| 9,849,364 B2 | 12/2017 | Tran et al. | |
| 2009/0272798 A1 | 11/2009 | Dedis et al. | |
| 2013/0157765 A1 | 6/2013 | Nkouatchet Wandji | |
| 2016/0217532 A1* | 7/2016 | Slavin | G06Q 30/0276 |

(Continued)

FOREIGN PATENT DOCUMENTS

BR 102015012783 A2 * 1/2016 ............. G06Q 20/06

OTHER PUBLICATIONS

Muniba Memon, Umair Ahmed Bajwa, Asad Ikhlas, and Syed Shahbaz Hussain, Blockchain beyond Bitcoin: Blockchain Technology Challenges and Real-World Applications, Aug. 1, 2018, IEEE, web, 29-33 (Year: 2018).*

(Continued)

*Primary Examiner* — I Jung Liu
(74) *Attorney, Agent, or Firm* — Armstrong Teasdale LLP

(57) ABSTRACT

A blockchain-based social insurance ("BBSI") computer system for creating a social insurance group is provided. The BBSI computer system includes at least one processor in communication with at least one memory device. The processor is programmed to receive social insurance group data and define at least one qualifying rule for joining the social insurance group. Each member of the social insurance group must satisfy the at least one qualifying rule to become a member of the social insurance group. The processor is programmed to generate at least one social insurance group blockchain including the qualifying rule and cause to be displayed on a user device the social insurance group data for review by a candidate member. The processor is also programmed to receive a registration message from the candidate member including a request to become a member of the group.

20 Claims, 11 Drawing Sheets

(56) References Cited

U.S. PATENT DOCUMENTS

2017/0039330 A1    2/2017    Tanner et al.
2017/0103468 A1    4/2017    Orsini et al.
2018/0285879 A1    10/2018    Gadnis et al.
2018/0307859 A1    10/2018    LaFever et al.
2019/0013933 A1    1/2019    Mercuri et al.

OTHER PUBLICATIONS

HU. (2018). Friendsurance: Friends with Benefits?, Harvard Business School Digital Initiative. Retrieved Jul. 29, 2019, from www.digital.hbs.edu/platform-digit/submission/friendsurance-friends-with-benefits/#.

Teambrella. Retrieved Jul. 29, 2019, from www.teambrella.com/.

Terry, H. Teambrella—Bitcoin Enabled P2P Insurance, The Digital Insurer. Retrieved Jul. 29, 2019, from www.the-digital-insurer.com/dia/teambrella-bitcoin-enabled-p2p-insurance/.

Tayeb, H. (2016). Lemonade Insurance: I do not think P2P means what you think it means, Tearsheet. Retrieved Jul. 29, 2019, from www.tearsheet.co/insurtech/lemonade-insurance-i-do-not-think-p2p-means-what-you-think-it-means/.

Lamparelli, N. Don't Believe the Hype—The Lemonade Story, Insurance Nerds. Retrieved Jul. 29, 2019, from www.insnerds.com/lemonade-hype/.

Howard, "Distributed Social Proof Insurance: The Next Industry Game-Changer?", web article, Insurance Journal, dated Feb. 12, 2018, 19 pages.

"Sharing Economy: Implications for the Insurance Industry in Canada", The Insurance Institute of Canada, ISBN 0-919244-28-9, 2017.

\* cited by examiner

BLOCKCHAIN-BASED SYSTEMS AND METHODS FOR SELF-MANAGED PEER GROUP INSURANCE

CROSS REFERENCE TO RELATED APPLICATIONS

This application claims priority to and the benefit of the filing date of U.S. Provisional Application No. 62/733,499 filed on Sep. 19, 2018, entitled "BLOCKCHAIN-BASED SYSTEMS AND METHODS FOR SELF-MANAGED PEER GROUP INSURANCE," and to U.S. Provisional Patent Application No. 62/757,558 filed on Nov. 8, 2018, entitled "BLOCKCHAIN-BASED SYSTEMS AND METHODS FOR SELF-MANAGED PEER GROUP INSURANCE," the entire contents and disclosures of which are hereby incorporated herein by reference in their entirety.

FIELD OF THE DISCLOSURE

The present disclosure generally relates to self-managed, peer group or social insurance and, more particularly, to a network-based system and method for managing social insurance systems using blockchain technologies.

BACKGROUND

The sharing-economy is a burgeoning phenomenon. With the advent of technology-based social interaction, the sharing of resources and activities within local communities has increased dramatically. Existing relationships have formed the foundation of a community and led to naturally created sharing groups. However, the benefits of a sharing group may be dependent on the reliability of the relationships. Reputations may therefore be used to establish minimum thresholds for membership. In some cases, review-based methods may be used to build and maintain trust amongst group members. Use of reviews and social pressures may also be used to normalize the behavior of the members.

In some cases, a sharing community may rely on existing infrastructure as a foundation for the group share. For example, roads, highways and traffic systems may support ride-sharing groups. In other cases, the Internet is used as the underlying infrastructure for a sharing community. Enhancements of existing underlying infrastructure may aid in facilitating a group share. For example, the sharing of goods and services over the Internet has led to the development of cryptographic solutions for enhanced security. There exists a need for infrastructure that may be used to provide transparent and secure ways for communities to organize and administrate the benefits of group sharing of information and resources.

BRIEF SUMMARY

The present embodiments may relate to blockchain-based systems and methods for establishing and operating peer group or social insurance systems. The present embodiments involve providing a platform and ecosystem that allows self-organizing customer groups, usually those that have a social connection to minimize fraud, to insure themselves with a minimum of insurer interaction. The ecosystem provided by a large insurer may allow small groups of socially connected people to form groups and act as a sort of (or actual) reciprocal insurance group, where the larger insurer would act as attorney-in-fact, perform automated underwriting/AI (Artificial Intelligence) on groups and/or participants, collect premiums, and run the administrative and IT (Information Technology) aspects of the insurance arrangements. In the preferred embodiments, the insurance may be targeted for limited risks, such as "glass" and "deductible insurance" (insurance for the risks of having a claim and paying the deductible of $1,000+). There may be other risks that are identified that social groups may be insured for, and the risk and terms of insurance may each be determined by each group.

In one aspect, a blockchain-based social insurance ("BBSI") computer system for creating a social insurance group is provided. In some exemplary embodiments, the BBSI computer system includes at least one processor in communication with at least one memory device. The at least one processor may be programmed to: (i) receive social insurance group data; (ii) define at least one qualifying rule for joining the social insurance group based upon the social insurance group data, wherein each member of the social insurance group must satisfy the at least one qualifying rule to become a member of the social insurance group; (iii) generate at least one social insurance group blockchain including the at least one qualifying rule; (iv) cause to be displayed on a user device the social insurance group data including the at least one qualifying rule for review by a candidate member; and/or (v) receive, from the user device, a registration message from the candidate member, the registration message including a request for the candidate member to become a member of the group. The BBSI computer system may be configured with additional, less, or alternate functionality, including that discussed elsewhere herein.

In another aspect, a least one non-transitory computer-readable media having computer-executable instructions thereon is provided. When executed by at least one processor of a blockchain-based social insurance (BBSI) computing device, the computer-executable instructions may cause the at least one processor of the BBSI computing device to: (i) receive social insurance group data; (ii) define at least one qualifying rule for joining the social insurance group based upon the social insurance group data, wherein each member of the social insurance group must satisfy the at least one qualifying rule to become a member of the social insurance group; (iii) generate at least one social insurance group blockchain including the at least one qualifying rule; (iv) cause to be displayed on a user device the social insurance group data including the at least one qualifying rule for review by a candidate member; and/or (v) receive, from the user device, a registration message from the candidate member, the registration message including a request for the candidate member to become a member of the group. The instructions may direct additional, less, or alternate operations or functionality, including those discussed elsewhere herein.

In yet another aspect, a computer-implemented method for providing social insurance is provided. The method may be implemented using a blockchain-based social insurance ("BBSI") computing device including at least one processor in communication with at least one memory device. The method may include: (i) receiving social insurance group data; (ii) defining at least one qualifying rule for joining the social insurance group based upon the social insurance group data, wherein each member of the social insurance group must satisfy the at least one qualifying rule to become a member of the social insurance group; (iii) generating at least one social insurance group blockchain including the at least one qualifying rule; (iv) causing to be displayed on a least one qualifying rule for review by a candidate member; and/or (v) receiving from the user device, a registration message from the candidate member, the registration message including a request for the candidate member to become a member of the group. The method may include additional, less, or alternate actions, including those discussed elsewhere herein.

In yet another aspect, a blockchain-based social insurance ("BBSI") computer system for executing a claim in a social insurance group is provided. The BBSI computer system may include at least one processor in communication with at least one memory device. The at least one processor may be programmed to: (i) store social insurance group data including data for at least one member of the social insurance group; (ii) receive a member insurance claim; (iii) transmit the insurance claim to the at least one member of the social insurance group; (iv) receive an insurance claim decision; and/or (v) execute the insurance claim decision. The BB SI computer system may be configured with additional, less, or alternate functionality, including that discussed elsewhere herein.

In yet another aspect, a least one non-transitory computer-readable media having computer-executable instructions thereon is provided. When executed by at least one processor of a BBSI computing device, the computer-executable instructions may cause the at least one processor of the BBSI computing device to: (i) receive social insurance group data; (ii) define at least one rule for the social insurance group based upon the social insurance group data; (iii) generate at least one social insurance group blockchain including the at least one rule; (iv) transmit the at least one social insurance group blockchain to at least one member; and/or (v) receive at least one member agreement blockchain from the at least one member. The instructions may direct additional, less, or alternate operations or functionality, including those discussed elsewhere herein.

In yet another aspect, a computer-implemented method for providing social insurance is provided. The method may be implemented using a blockchain-based social insurance ("BBSI") computing device including at least one processor in communication with at least one memory. The method may include: (i) receiving social insurance group data; (ii) defining at least one rule for the social insurance group based upon the social insurance group data; (iii) generating at least one social insurance group blockchain including the at least one rule; (iv) transmitting the at least one social insurance group blockchain to at least one member; and/or (v) receiving at least one member agreement blockchain from the at least one member. The method may include additional, less, or alternate actions, including those discussed elsewhere herein.

Advantages will become more apparent to those skilled in the art from the following description of the preferred embodiments which have been shown and described by way of illustration. As will be realized, the present embodiments may be capable of other and different embodiments, and their details are capable of modification in various respects. In addition, although certain steps of the exemplary processes are numbered, having such numbering does not indicate or imply that the steps necessarily have to be performed in the order listed. The steps may be performed in the order indicated or in another order. Accordingly, the drawings and description are to be regarded as illustrative in nature and not as restrictive.

BRIEF DESCRIPTION OF THE DRAWINGS

The Figures described below depict various aspects of the systems and methods disclosed therein. It should be understood that each Figure depicts an embodiment of a particular aspect of the disclosed systems and methods, and that each of the Figures is intended to accord with a possible embodiment thereof. Further, wherever possible, the following description refers to the reference numerals included in the following Figures, in which features depicted in multiple Figures are designated with consistent reference numerals.

There are shown in the drawings arrangements which are presently discussed, it being understood, however, that the present embodiments are not limited to the precise arrangements and are instrumentalities shown, wherein.

Figure 1:
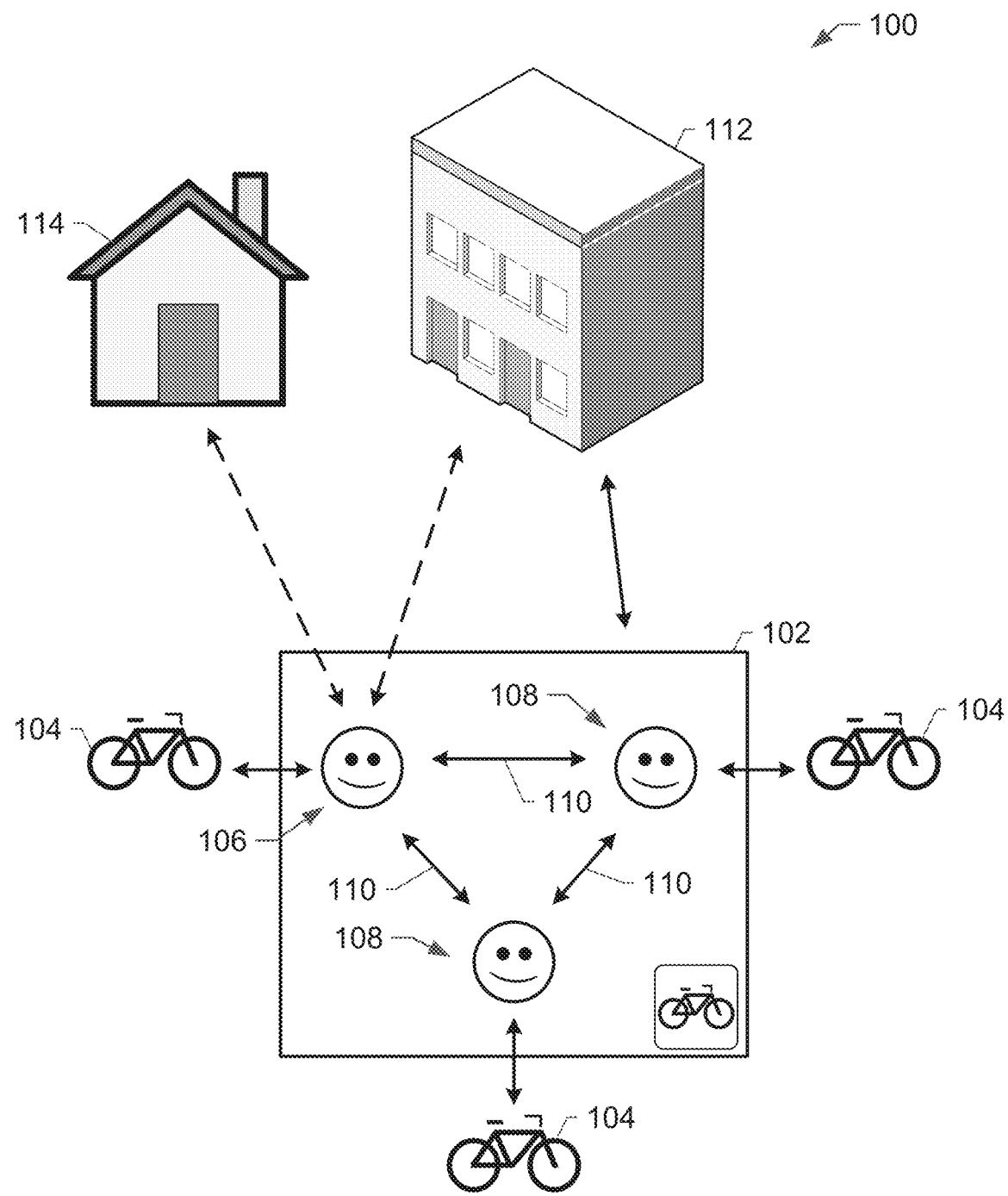
FIG. 1 illustrates an exemplary social insurance group system.

The Figures depict preferred embodiments for purposes of illustration only. One skilled in the art will readily recognize from the following discussion that alternative embodiments of the systems and methods illustrated herein may be employed without departing from the principles of the invention described herein.

DETAILED DESCRIPTION

The systems and methods described herein relate to, inter alia, systems and methods for providing peer-based group insurance. In at least one embodiment, a social insurance system is managed by using blockchains. In one exemplary embodiment, the process may be performed by a blockchain-based social insurance ("BBSI") computing device associated with an insurance provider, also known as a blockchain-based social insurance ("BBSI") server.

A blockchain is a distributed database that maintains a continuously-growing list of ordered records, known as blocks. Each block may contain at least a timestamp and a link to the previous block in the chain. The link to the previous block may be a hash of the previous block. For example, in the case of an insurance contract, the first block may contain the initial contract between a driver and an insurer. The second block may contain a modification to the contract that was requested by the driver and approved by the insurer. The second block may contain a hashed copy of the first block as well. The third block may contain one or more additional terms for the insurance contract and a hashed copy of the second block. This continues on with each block adding on to the next while containing a hash of the previous blocks in the blockchain.

To ensure the security of the information contained in the blockchain, copies of the blockchain are distributed across multiple computer devices, known as nodes. These nodes maintain the blockchain, update the blockchain when changes occur, and ensure the stability of the blockchain itself. In some embodiments, nodes may also be used to calculate the hash of the previous blocks. As the blockchain grows, the processing power needed to calculate the hash of the previous blocks grows as well. In these embodiments, the processing of the hash may be distributed over multiple computer devices to improve the speed of processing and/or to not overburden the hashing processor. When a node processes (hashes) a block, that node is known as a miner, where the action of validating and hashing the block is also known as mining.

Conventional insurance contracts require minimum value, pricing, cost, and/or size thresholds before underwriting or execution by an insurer. Individual items of minimal value may be costly and/or difficult to insure. In contrast, a group insurance model operating under a collective agreement between members of the group seeking to insure a number of low value items may, when combined, generate sufficient value for a large insurance provider to efficiently and cost-effectively insure. In this manner, the members of the group may be able to benefit from the services provided by the large insurance provider. Large numbers of members in the group, however, may lead to increased costs and other difficulties such as determining risk profiles for all the members and determining a collective risk profile. Groups formed on the basis of established social relationships between the members may aid in identifying the risk profile of potential members and enforcing less risky behaviors of existing members.

Peer-to-peer commerce systems (also known as sharing economy systems) allow for the exchange of goods and/or services on an individual basis, so that individuals are exchanging the goods and/or services with other individuals. Examples of these exchanges, include but are not limited to online auctions, online classifieds, ride sharing, residence sharing, vehicle sharing, commute sharing, and travel sharing. In most sharing economy systems, a list of individuals that are willing to offer a service, such as a car ride or a residence rental, list their proposed transaction on a website or other online platform. In one embodiment, an individual interested in acquiring insurance for a product or service may advertise an offer to purchase an insurance contract from multiple parties. If a requisite number of individuals agree to provide a specified amount of benefit in the event of the identified outcome, an insurance agreement may be underwritten by the group for the individual. In the exemplary embodiment, a group of individuals may join together to insure each member of the group.

In the exemplary embodiment, an insurance provider is connected to a sharing economy system, such as, but not limited to, a ride-sharing, a car-sharing, and/or a residence-sharing system. For example, a number of ride-sharing providers in the ride-sharing economy may form a social insurance group for group insurance. In the exemplary embodiment, the sharing economy system is a social insurance ecosystem and/or platform hosted by the insurance provider. In other embodiments, the sharing economy system is separate from the insurance provider, and the insurance provider is in communication with the sharing economy system. In some embodiments, the insurance provider provides insurance to groups. In the exemplary embodiment, members of the social insurance group each insure the other members of the group while the insurance provider provides other services such as administration, premium collection, IT services, etc.

At least one of the technical problems addressed by this system may include: (i) distributing the computational requirements of transactions within a social insurance group; (ii) increasing transparency and access to transactional records within the social insurance group; (iii) increasing reliability, verifiability, and/or trust of executed transactions within the social insurance group; (iv) improving data integrity and security of transactions within the social insurance group; (v) improving the accuracy of data for modeling; (v) reducing enforcement, administration, and/or clearinghouse time and costs; and/or (vi) providing a network-based platform for providing social group-based insurance.

The methods and systems described herein may be implemented using computer programming or engineering techniques including computer software, firmware, hardware, or any combination or subset thereof, wherein the technical effects may be achieved by performing at least one of the following steps: (a) receiving social insurance group data; (b) defining at least one rule for the social insurance group based upon the social insurance group data; (c) generating at least one social insurance group blockchain including the at least one rule; (d) transmitting the at least one social insurance group blockchain to at least one member; and (e) receiving at least one member agreement blockchain from the at least one member.

Exemplary Peer-Based Group Insurance Systems

In the exemplary embodiment, an insurance provider is connected to a sharing economy system. In some embodiments, the sharing economy system is hosted by the insurance provider. In other embodiments, the sharing economy system is separate from the insurance provider, and the insurance provider is in communication with the sharing economy system. In the exemplary embodiment, a number of peers in the sharing economy may join together to form a peer-based group to provide insurance.

FIG. 1 depicts a view of an exemplary social insurance system 100. In the exemplary embodiment, a social insurance group 102 is a group of individuals that share a mutual interest in insuring an asset such as a bicycle 104. Each member 106 and 108 has a bicycle 104. Each member also maintains relationships 110 with the other members of social insurance group 102. Members of social insurance group 102 need not be "related" as defined by law, rather relationships may include relationships by law, relationships by common interest, professional relationships, relationships by geography and/or other factors that may lead people to become affiliated for some purpose. In the exemplary embodiment, members 106 and 108 share a common interest in riding bicycles 104 and may have each purchased expensive bicycles 104. Each member 106 and 108 may have a desire to protect their bicycles 104.

In the exemplary embodiment, social insurance group 102 receives insurance services from an insurance provider 112. In some embodiments, insurance provider 112 underwrites a single insurance contract with social insurance group 102. In the exemplary embodiment, insurance provider 112 merely provides insurance services such as administration, premium collection, IT services, etc. In some embodiments, insurance provider 112 may collect data from members 106 and 108 or other potential members and perform statistical modeling analysis to determine a profile for members 106 and 108 or the potential member. In the exemplary embodiment, insurance provider 112 prepares an insurance contract to be agreed upon between members 106 and 108. Individual members 106 and 108 are thus mutually providing insurance amongst and/or between the members while insurance provider 112 provides support services.

In the exemplary embodiment, member 106 may independently obtain insurance for other assets, such as a house 114, from insurance provider 112.

Figure 2:
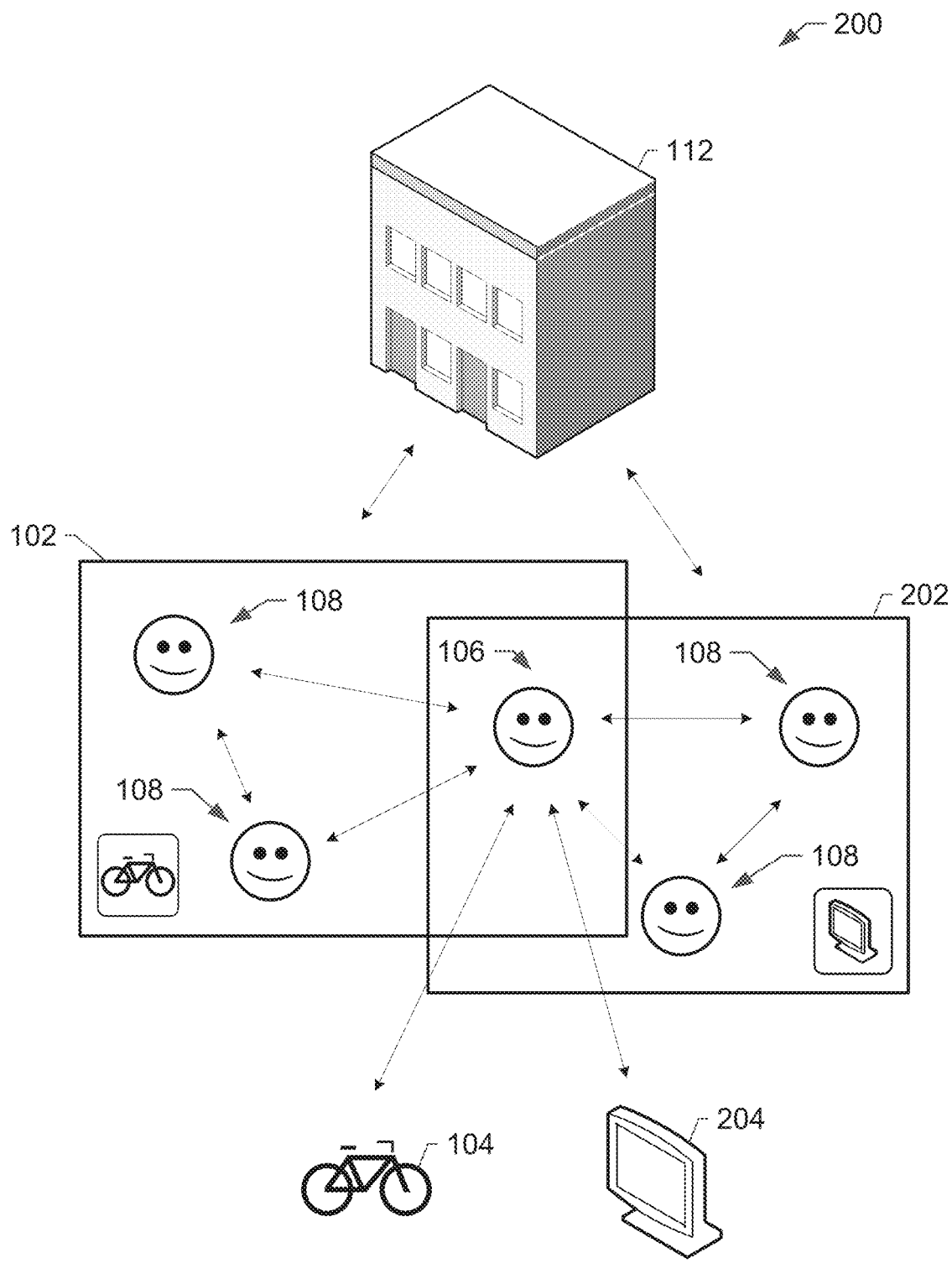
FIG. 2 illustrates a second social insurance group with the social insurance group shown in FIG. 1.

FIG. 2 depicts an exemplary second social insurance group 202. In the exemplary embodiment, in addition to membership in an enthusiast group related to bicycles, member 106 may also be affiliated with an enthusiast group associated with media devices. Therefore, in addition to membership with social insurance group 102, member 106 may additionally desire insurance coverage for other assets such as media device 204. In the exemplary embodiment, member 106 may be a media device enthusiast and associated with a second peer group related to media devices such as media device 204. Member 106 may form and/or join social insurance group 202 to obtain insurance coverage for media device 204. Member 106 is therefore a member of both social insurance groups 102 and 202. In the exemplary embodiment, insurance coverage for social insurance group 202 is provided in a method similar to social insurance group 102 as described herein.

Exemplary Blockchain Based Social Insurance System

Figure 3:
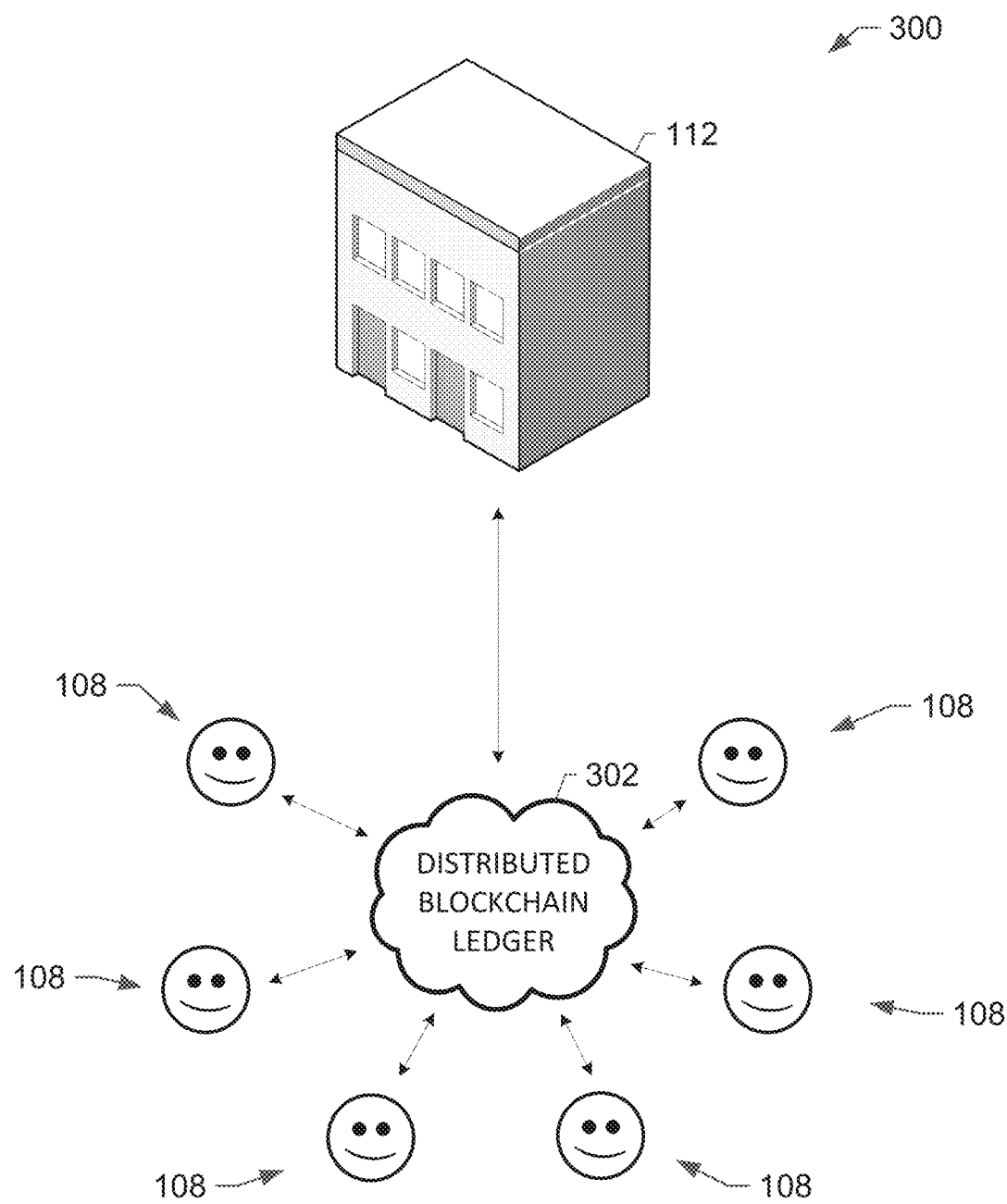
FIG. 3 illustrates an exemplary blockchain implementation of the social insurance group system shown in FIG. 1.

FIG. 3 depicts an exemplary blockchain implementation of a social insurance system 300 implemented by a distributed blockchain ledger 302. Members 108 of a social insurance group, such as social insurance group 102 (shown in FIG. 1), use social insurance group system 100 (shown in FIG. 1) to coordinate the social insurance activities. Distributed blockchain ledger 302 may be used by the social insurance group 102 to record member data, record agreements, record and transfer payment of premiums, record claims data, and record and transfer payments of claims benefits. Insurance provider 112 may provide a platform for members 108 to organize. For example provider 112 may host a web server to allow members to exchange information in a central location. In some embodiments, insurance provider 112 may collect premiums and/or distribute benefits. In some embodiments, insurance provider 112 may analyze data such as activity data from member 108 to generate predictive risk models.

Exemplary Process for Creating Social Insurance Systems

Figure 4:
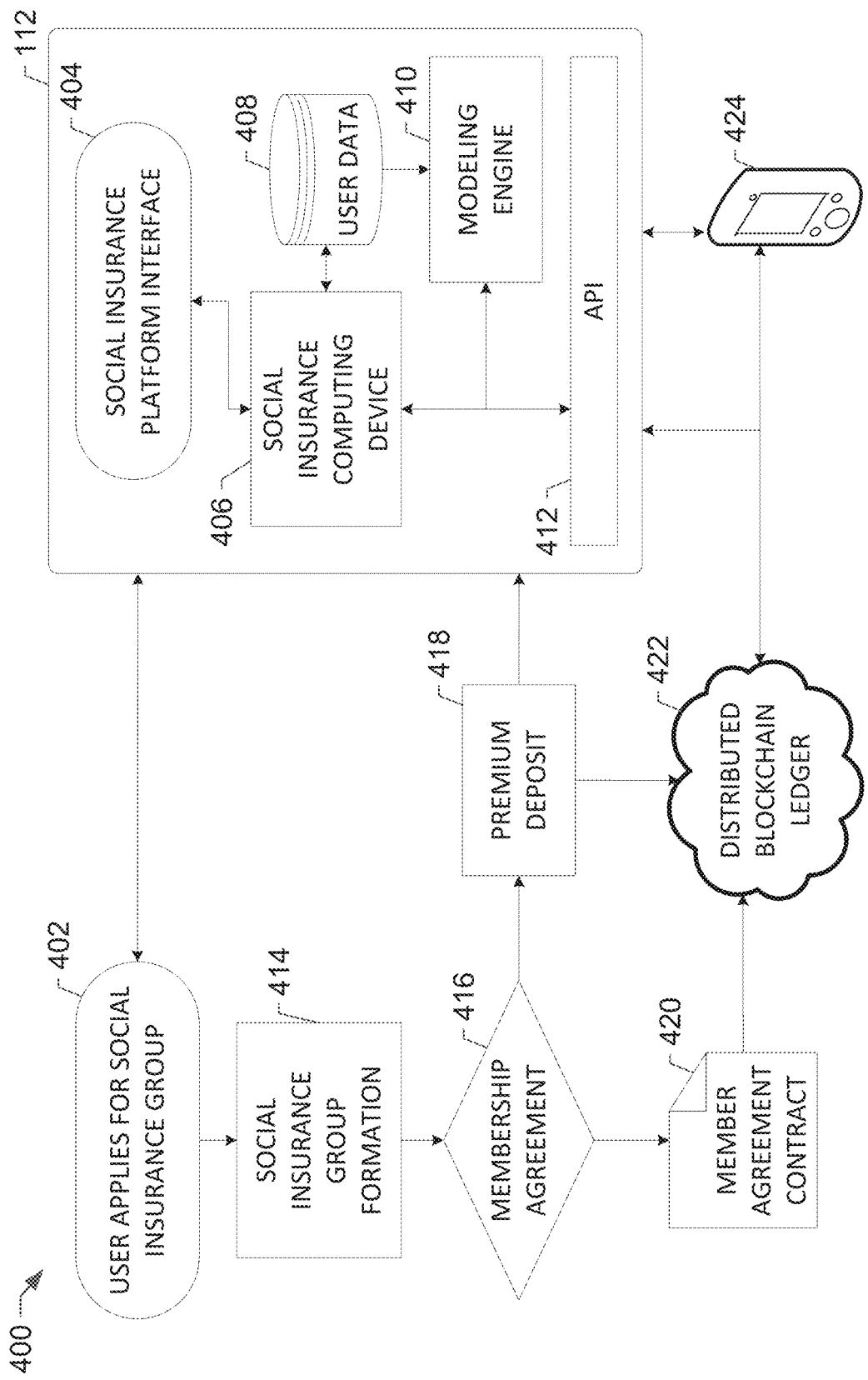
FIG. 4 illustrates an exemplary data flow diagram for establishing the social insurance group shown in FIG. 1.

FIG. 4 depicts an exemplary data flow diagram 400 for establishing a social insurance group such as social insurance group 102 shown in FIG. 1. In the exemplary embodiment, initial configuration of social insurance group system 100 may be initiated by member 106 (shown in FIG. 1) using a user application 402 (e.g., registration form) creation process to create social insurance group 102. User application 402 is transmitted to an insurance provider such as insurance provider 112 (shown in FIG. 1). In some embodiments, user application 402 may be transmitted using the Internet such as via email. In some embodiments, the creation of social insurance group 102 may be initiated on a user computing device via an app or other software application. For example, user application 402 may be completed in a form on a website. In some embodiments, user application 402 appears as a form in a mobile app that may be partially processed and/or executed as computer code on a user computing device such as user computing device 424, as described below.

User application 402 may include data related to member 106 and/or data related to social insurance group 102. For example, if member 106 periodically rides bicycle 104 (shown in FIG. 1) and is interested in insuring at least a part of bicycle 104, the type of bicycle may be included in user application 402, or a picture of bicycle 104 may be uploaded as part of user application 402. Additionally or alternatively, data related to user behavior such as frequency of riding bicycle 104, geographical location bicycle 104 is used, and duration of each use of bicycle 104 may be included in user application 402. Group data for social insurance group 102 may also be included in user application 402 such as the type of group, (e.g., social group, competitive and/or team sport, etc.). Additionally or alternatively, data related to the duration of social insurance group 102 may be included in user application 402.

In the exemplary embodiment, insurance provider 112 may include a social insurance platform interface 404 for member 106 to submit user application 402 or conduct other settings and/or configuration activities for existing social insurance groups. Social insurance platform interface 404 communicates with a social insurance computing device 406. Social insurance computing device 406 is configured to at least transmit instructions to social insurance platform interface 404 and receive data from social insurance platform interface 404. Social insurance computing device 406 may be associated with an insurance provider. In some embodiments, social insurance computing device 406 may be associated with a third-party. Social insurance computing device 406 may also be in communication with a database such as a user database 408 for storing user data such as data associated with member 106. The user data may be entered by member 106 and/or retrieved by other means (e.g., third parties, government agencies, etc.). The user data stored in user database 408 may be used to generate risk profiles of a social insurance group by generating a model using a modeling engine 410. In the exemplary embodiment, insurance provider also provides an API to allow access to modeling engine 410 and user database 408 via social insurance computing device 406.

In some embodiments, insurance provider 112 determines whether user application 402 meets pre-determined criteria so as to be sufficient for insurance provider 112 to support social insurance group 102. For example, insurance provider 112 may employ a rules-based process by which insurance provider 112 compares data from user application 402 to the pre-determined criteria. For example, insurance provider 112 may require a minimum amount of total premiums, and/or a minimum individual premium contribution, and/or a minimum number of members, and/or a minimum valuation of assets to be insured before providing the services needed to support social insurance group 102 as an insurance group.

In the exemplary embodiment, social insurance computing device 406 receives user application 402 via social insurance platform interface 404 and stores the application data in user database 408. Upon acceptance of user application 402, social insurance computing device 406 confirms the formation 414 of social insurance group 102. In some embodiments, acceptance of user application 402 may include generating at least one model and/or determining whether the user and/or the social insurance group meets and/or satisfies pre-defined thresholds. In the exemplary embodiment, member 106 inputs rules into user application 402 to define requirements, settings and/or characteristics of social insurance group 102.

Upon formation 414 of social insurance group 102, a potential member is invited to join social insurance group 102. The potential member reviews the requirements of social insurance group 102 and agrees 416 to join social insurance group 102 and deposits the required premium 418. In some embodiments, potential members may be evaluated by members 106 and 108 prior to joining the group. Membership may therefore be dependent on acceptance by existing members 106 and 108. Requirements for membership of social insurance group 102 may be based upon existing relationships or membership in an existing social group such as a particular employer, church, professional organization, social club, etc.

In the exemplary embodiment, premiums may be transferred to insurance provider 112 via transactions such as check, credit card, etc. Insurance provider 112 may then hold all premiums for insurance group 102 in an account such as an escrow account. In some embodiments, premiums may be in the form of a blockchain-based payment method, for example as cryptocurrency. Cryptocurrency premiums may be stored in a digital wallet stored by insurance provider 112, by a member of social insurance group 102, or by another third party that maintains digital wallets for storing cryptocurrency.

In the exemplary embodiment, a membership agreement contract 420 is prepared for the potential members that have agreed to join social insurance group 102. Membership agreement contract 420 may be a document jointly authorized, signed, certified and/or notarized by at least one new member, such as member 108, that is interested in joining social insurance group 102. In some embodiments, membership agreement contract 420 is a smart contract. In some embodiments, the smart contract may be an electronic document that includes certain terms and conditions that are stored in a template. The template may include certain blank data fields that are filled by an auto-complete process from data provided by new member 108.

In the exemplary embodiment, membership agreement contract 420 is implemented by the creation of a new block in a blockchain for membership agreements, and is created by and transmitted and/or transferred from member 108 to insurance provider 112. In some embodiments, membership agreement contract 420 is transmitted and/or transferred to member 106. In other embodiments, membership agreement contract 420 is transmitted to nodes in a distributed blockchain ledger 422. In some embodiments, insurance provider 112 may store membership agreement contract 420 in user database 408. Membership agreement contract 420 may further be made available via an application programming interface (API) 412.

In the exemplary embodiment, each member 106 and 108 operates a node of distributed blockchain ledger 422. Transactions in social insurance group 102 are simultaneously recorded at each node in distributed blockchain ledger 422. In some embodiments, insurance provider 112 is also a node in distributed blockchain ledger 422. In the exemplary embodiment, members 106 and 108 may view all transactions recorded in social insurance group 102 using a user computing device 424. In some embodiments, insurance provider 112 may provide reconciliation and/or identification of discrepancies of transactions stored in distributed blockchain ledger 422.

Exemplary Claims Process for Social Insurance Systems

Figure 5:
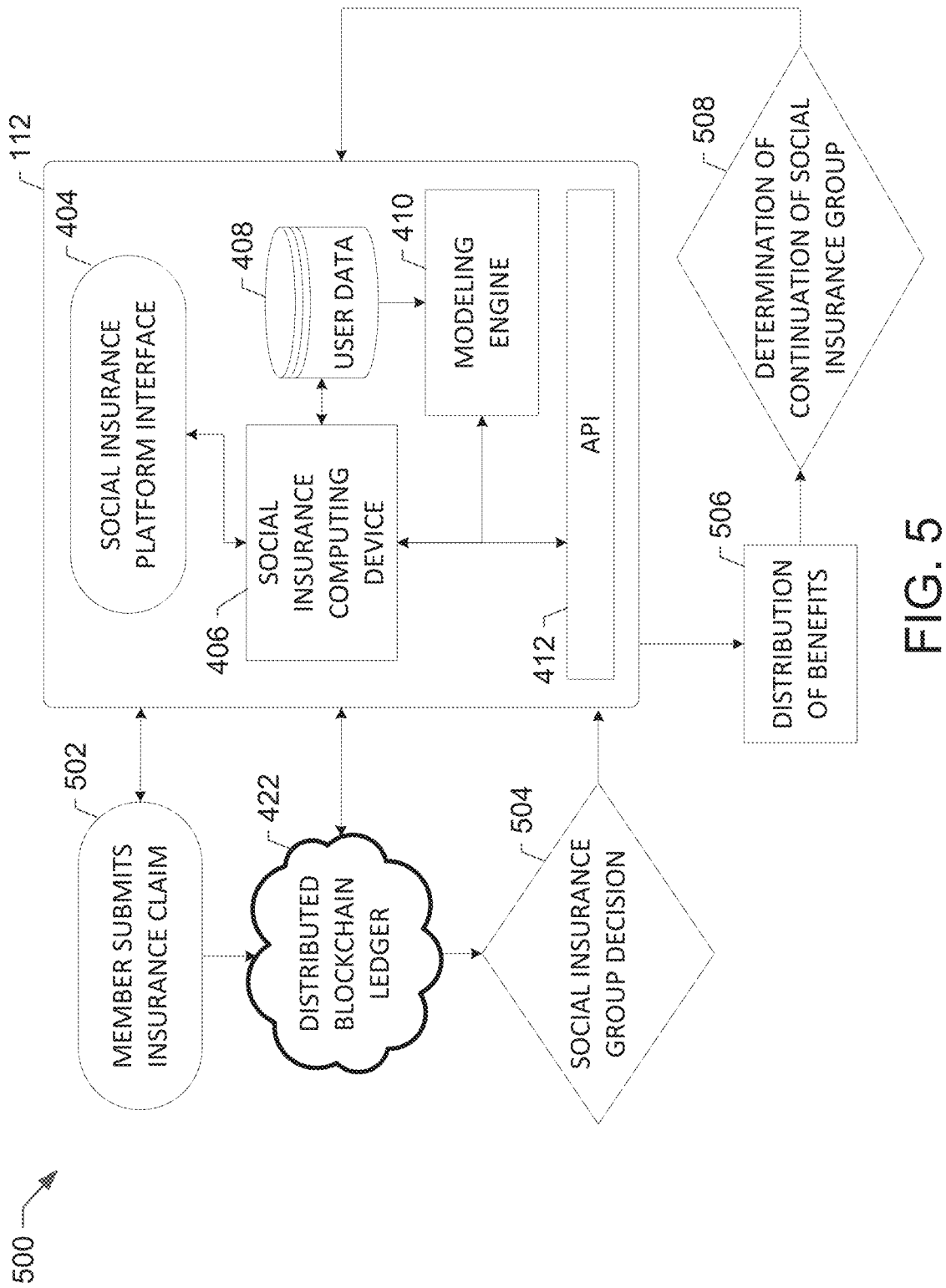
FIG. 5 illustrates an exemplary data flow diagram of the claims process of the social insurance group system shown in FIG. 1.

FIG. 5 illustrates an exemplary data flow diagram of a claims process for social insurance group system 100 shown in FIG. 1. In the exemplary embodiment, a member of social insurance group 102 (shown in FIG. 1), such as requesting member 106 (shown in FIG. 1), submits an insurance claim 502 which creates a new block in a blockchain of claims. The new block is transmitted to the nodes in the distributed blockchain ledger 422 where other members 108 may access the insurance claim 502 data. In some embodiments, requesting member 106 uses a user computing device 424 causing the new block to be generated and populates the block data with data related to the claim. In the exemplary embodiment, requesting member 106 uses social insurance platform interface 404 to submit a claim. Social insurance computing device 406 generates a new block with data input by requesting member 106 and transmits the blockchain data to distributed blockchain ledger 422. Insurance provider may also store the claims data in user database 408. Additionally, modeling engine 410 may use the claims data to generate predictive models. Further, social insurance computing device 406 may provide access to the claims data via API 412.

Other (non-requesting) members 108 (shown in FIG. 1) may be notified of a claim via distribution of the new blockchain data in distributed blockchain ledger 422. Other members 108 may view the claims data stored in the new block. In the exemplary embodiment, other members 108 may collectively determine a social insurance group decision 504 including whether to settle a claim and/or whether a claim is paid out and/or the amount of benefits to be remitted. For example, other members 108, after examining the data stored in the claims blockchain, may vote on whether to pay the claim. In other embodiments, other methods for determining if a claim is paid out may be used. For example, if social insurance group 102 has a large number of members, a subset of the group may be formed to determine if a particular claim is to be paid out once a new claim is generated. In some embodiments, a pre-determined committee may be formed to determine if a claim is to be paid out. In some embodiments, insurance provider 112 may provide an adjuster to investigate the claim. Investigations conducted by insurance provider 112 may be made available via API 412.

In the exemplary embodiment, upon the determination of a social insurance group decision 504, insurance provider 112 remits the determined amount to requesting member 106 by retrieving, from an escrow account having the premiums deposited by requesting member 106 and other members 108, the determined amount. The determined benefit is then distributed 506 to requesting member 106. In the exemplary embodiment, insurance provider 112 transmits a cash payment to requesting member 106. In some embodiments, a blockchain-based payment method such as a cryptocurrency is transmitted to requesting member 106.

Upon distribution of benefits 506, a determination 508 to continue social insurance group 102 is made. In some embodiments, rules governing social insurance group 102 are examined or automatically applied by the computer platform. In other embodiments, members 106 and 108 may vote to disband social insurance group 102. In other embodiments, social insurance group 102 may be automatically disbanded. For example, if distribution of benefits 506 depletes premiums held in escrow or the amount held in escrow is below a minimum threshold, social insurance group 102 may be disbanded. In some embodiments, the minimum threshold may include a predetermined fee or cost assessment for insurance provider 112. In other embodiments, if a time period has elapsed, a rule governing the duration for social insurance group 102 is exceeded, or if the number of members is below a predetermined threshold, social insurance group 102 may be disbanded, and may be done so by a message being automatically sent out to each member notifying them of the disbandment and a final block is created.

In some embodiments, members 106 and 108 may be notified that social insurance group 102 is near a predetermined time or threshold and a request may be transmitted to members 106 and 108 to deposit additional premiums. In some embodiments, remaining premiums held in escrow may be transferred back to members 106 and 108. In some cases, if the time period has elapsed and no claims have been processed, the premiums less any expenses may be returned to members 106 and 108. Alternatively or additionally, a new social insurance group may be formed and remaining premiums for social insurance group 102 may be deducted from the premium deposit for members 106 and 108 required for the new social insurance group.

Exemplary Social Insurance Group System

Figure 6:
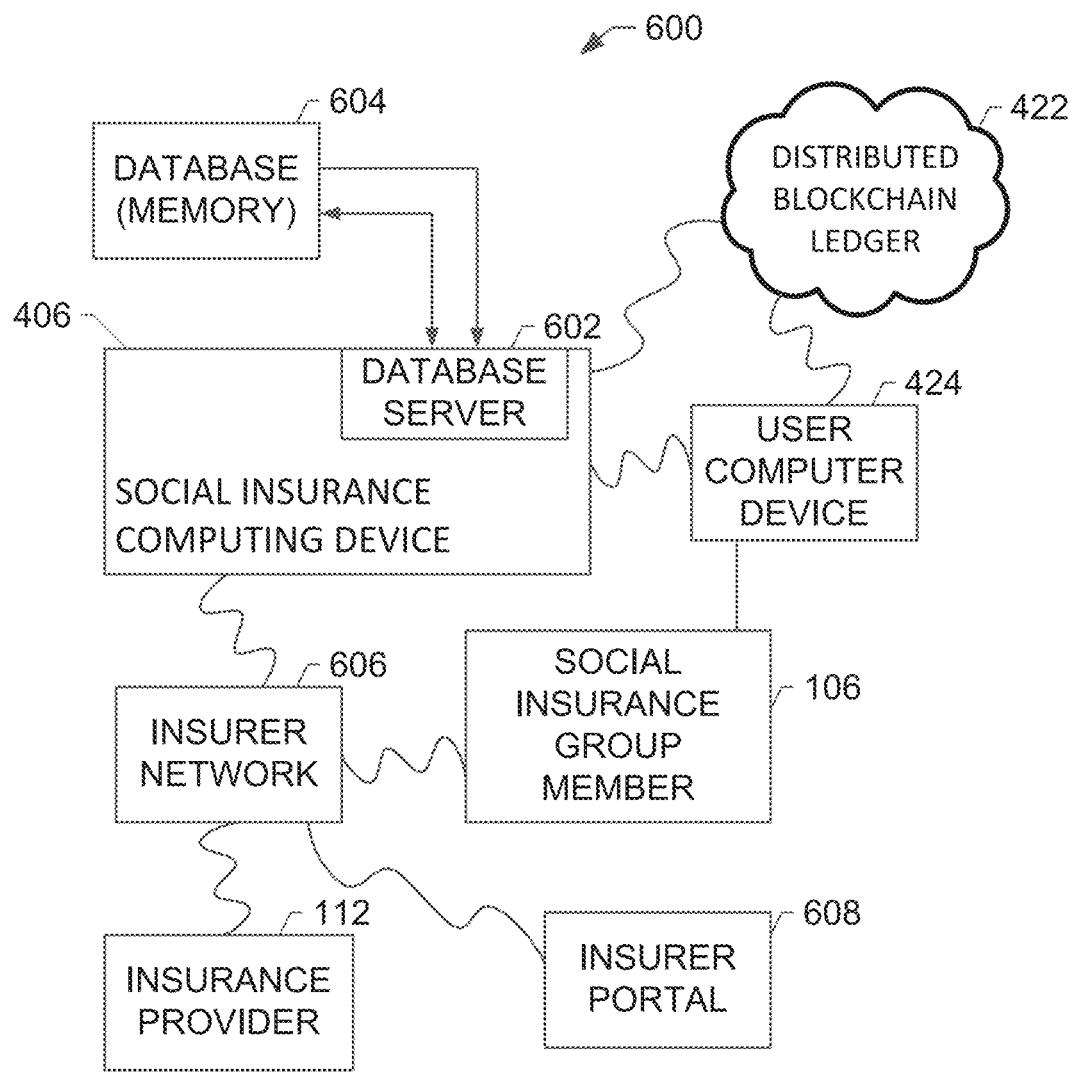
FIG. 6 illustrates an exemplary block diagram of the social insurance group system shown in FIG. 1.

FIG. 6 illustrates an exemplary block diagram 600 of the social insurance group system 100 shown in FIG. 1. In the exemplary embodiment, social insurance group system includes at least a social insurance computing device 406. Social insurance computing device 406 may include a database server 602 in communication with a database 604. In some embodiments database 604 may be user database 408 (shown in FIG. 4).

In the exemplary embodiment, social insurance computing device 406 is in communication with distributed blockchain ledger 422. Distributed blockchain ledger may also be in communication with user computer device 424. Social insurance computing device 406 is accessible by social insurance group member 106 via user computer device 424. Social insurance computing device 406 is communicatively coupled to insurer network 606. Insurance provider 112 may communicate with social insurance computing device 406 via insurer network 606. In some embodiments, insurance provider 112 may be in direct communication with social insurance computing device 406.

Social insurance group member 106 may alternately communicate with social insurance computing device and/or insurance provider 112 using an insurer portal 608 via insurer network 606. In the exemplary embodiment, insurer portal 608 is communicatively coupled to insurer network 606. In some embodiments, insurer portal 608 is social insurance platform interface 404 (shown in FIG. 4).

Exemplary User Computer Device

Figure 7:
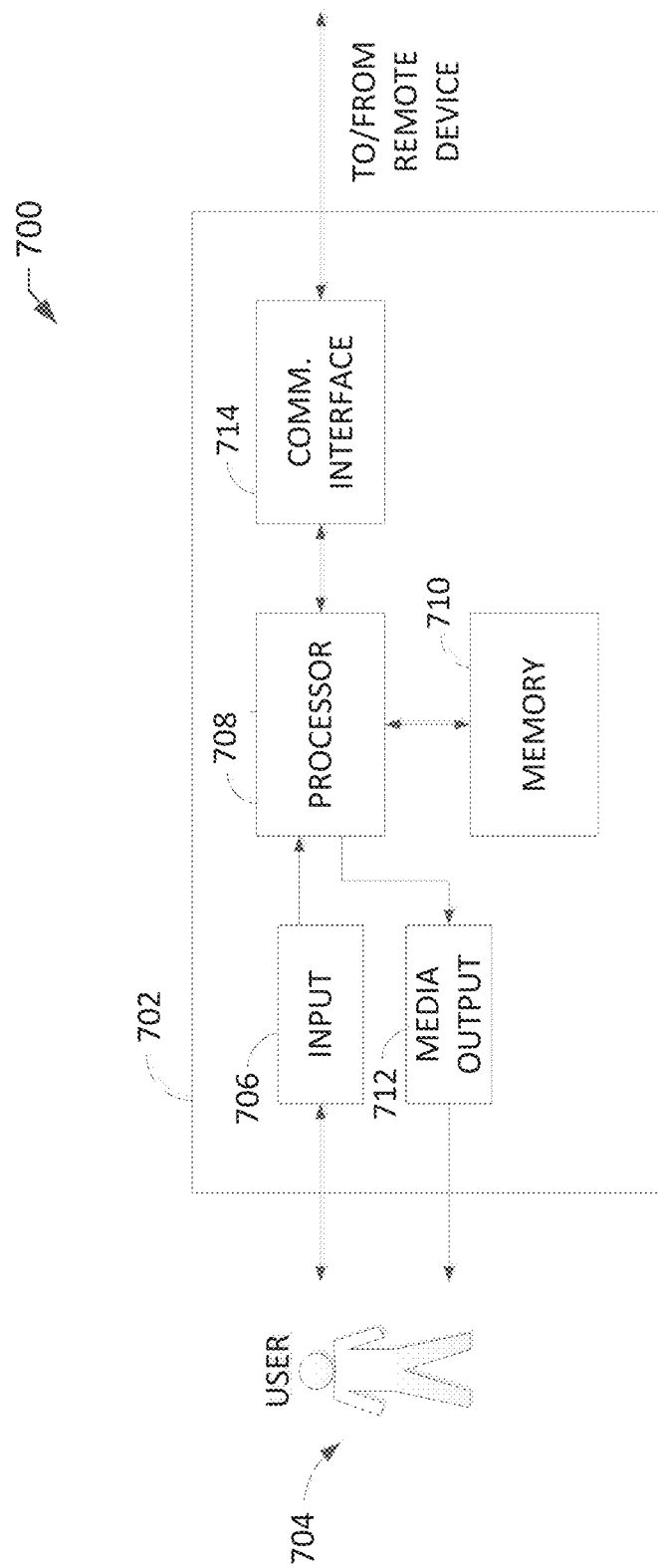
FIG. 7 illustrates an exemplary configuration of an exemplary user computing device.

FIG. 7 illustrates an exemplary configuration 700 of an exemplary user computing device 702. In some embodiments, user computing device 702 may be user computing device 424 (shown in FIG. 4).

User computer device 702 may be operated by a user 704 (e.g., a social insurance user). User computer device 702 may receive input from user 704 via an input module 706. User computer device 702 includes a processor 708 for executing instructions. In some embodiments, executable instructions may be stored in a memory area 710. Processor 708 may include one or more processing units (e.g., in a multi-core configuration). Memory area 710 may be any device allowing information such as executable instructions and/or transaction data to be stored and retrieved. Memory area 710 may include one or more computer-readable media.

User computer device 702 also may include at least one media output component 712 for presenting information to user 704. Media output component 712 may be any component capable of conveying information to user 704. In some embodiments, media output component 712 may include an output adapter (not shown), such as a video adapter and/or an audio adapter. An output adapter may be operatively coupled to processor 708 and operatively coupleable to an output device, such as a display device (e.g., a cathode ray tube (CRT), liquid crystal display (LCD), light emitting diode (LED) display, or "electronic ink" display) or an audio output device (e.g., a speaker or headphones).

In some embodiments, media output component 712 may be configured to present a graphical user interface (e.g., a web browser and/or a client application) to user 704. A graphical user interface may include, for example, social insurance group activity, and/or a wallet application for managing payment information such as cash and/or cryptocurrency payment methods.

In some embodiments, user computer device 702 may include an input device for receiving input from user 704. User 704 may use input devices to, without limitation, interact with social insurance system 100 (e.g., using an app) (shown in FIG. 1), distributed blockchain ledger 302 (shown in FIG. 3), or insurance provider 112 (shown in FIG. 1). Input devices may include, for example, a keyboard, a pointing device, a mouse, a stylus, and/or a touch sensitive panel (e.g., a touch pad or a touch screen). A single component, such as a touch screen, may function as both an output device of media output component 712 and an input device. User computer device 704 further may include at least one sensor, including, for example, a gyroscope, an accelerometer, a position detector, a biometric input device, a telematics data collection device, and/or an audio input device. In some embodiments, at least some data collected by user computer device 704 may be transmitted to insurance provider 112 to, for example, generate models. In the exemplary embodiment, data collected by user computer device 702 may be included in a claim submission.

User computer device 702 may also include a communication interface 714, communicatively coupled to insurance provider 112 (shown in FIG. 1) and/or distributed blockchain ledger 302 (shown in FIG. 3). Communication interface 714 may include, for example, a wired or wireless network adapter and/or a wireless data transceiver for use with a mobile telecommunications network.

Stored in memory area 710 may be, for example, computer-readable instructions for providing a user interface to user 704 via media output component 712 and, optionally, receiving and processing input from an input device using input module 706. The user interface may include, among other possibilities, a web browser and/or a client application. Web browsers enable users, such as user 704, to display and interact with media and other information typically embedded on a web page or a website hosted by insurance provider 112 and/or user computer device 702. A client application may allow user 704 to interact with, for example, social insurance computing device 406, distributed blockchain ledger 422, and social insurance platform interface 404 (all shown in FIG. 4). For example, instructions may be stored by a cloud service and the output of the execution of the instructions sent to the media output component 712.

Exemplary Server Device

Figure 8:
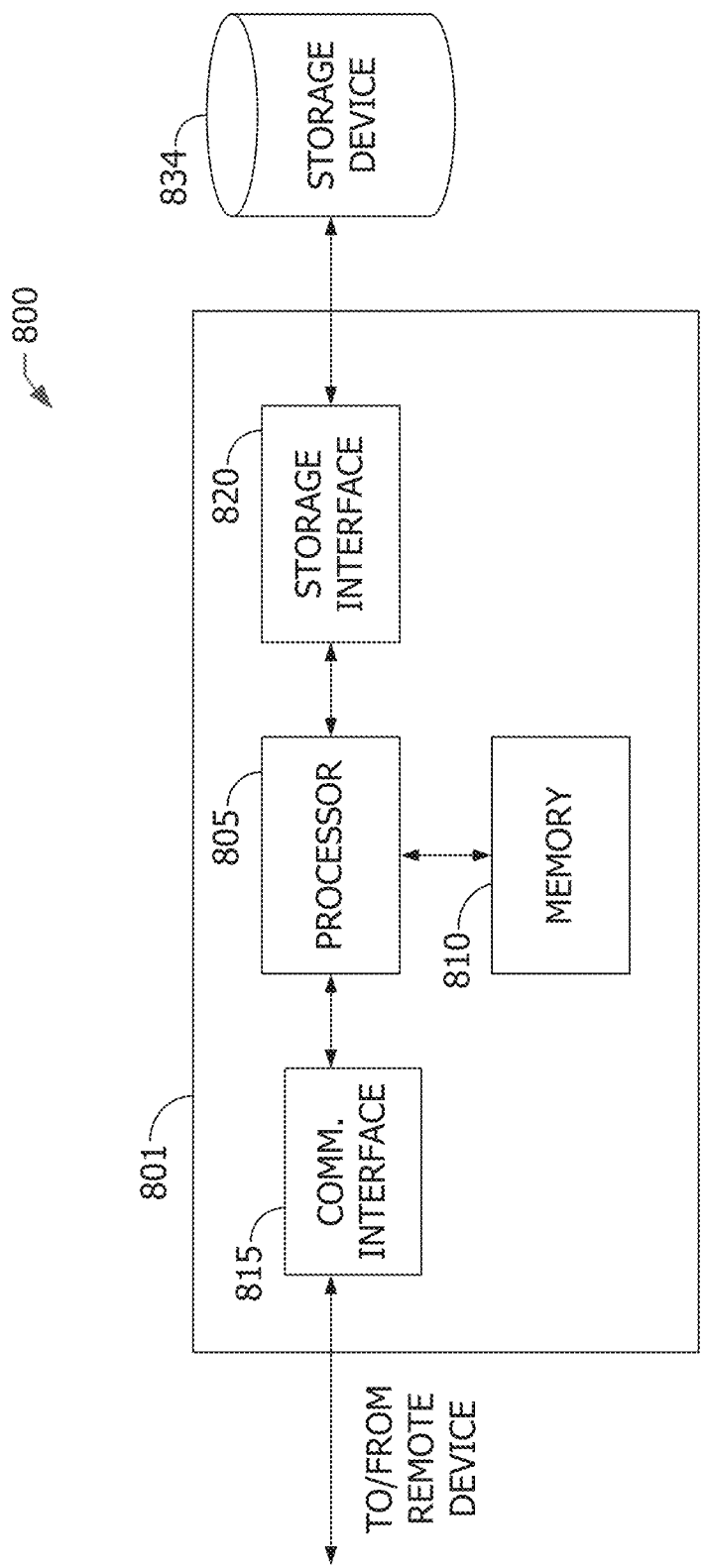
FIG. 8 illustrates an exemplary configuration of an exemplary server computing device.

FIG. 8 depicts an exemplary configuration of an exemplary server computing device 800, in accordance with one embodiment of the present disclosure. Server computer device 800 may include, but is not limited to, social insurance computing device 406 (shown in FIG. 4). Server computer device 800 may include a processor 805 for executing instructions. Instructions may be stored in a memory area 810. Processor 805 may include one or more processing units (e.g., in a multi-core configuration).

Processor 805 may be operatively coupled to a communication interface 815 such that server computer device 800 may be capable of communicating with a remote device such as another server computer device 800 or user computing device 424 (shown in FIG. 4). For example, communication interface 815 may receive requests from or transmit requests to user computer device 702 (shown in FIG. 7) via the Internet.

Processor 805 may also be operatively coupled to a storage device 820. Storage device 820 may be any computer-operated hardware suitable for storing and/or retrieving data, such as, but not limited to, data associated with user database 408 (shown in FIG. 4). In some embodiments, storage device 820 may be integrated in server computer device 800. For example, server computer device 800 may include one or more hard disk drives as storage device 820. In other embodiments, storage device 820 may be external to server computer device 800 and may be accessed by a plurality of server computer devices 800. For example, storage device 820 may include a storage area network (SAN), a network attached storage (NAS) system, and/or multiple storage units such as hard disks and/or solid state disks in a redundant array of inexpensive disks (RAID) configuration.

In some embodiments, processor 805 may be operatively coupled to storage device 820 via a storage interface 825. Storage interface 825 may be any component capable of providing processor 805 with access to storage device 820. Storage interface 825 may include, for example, an Advanced Technology Attachment (ATA) adapter, a Serial ATA (SATA) adapter, a Small Computer System Interface (SCSI) adapter, a RAID controller, a SAN adapter, a network adapter, and/or any component providing processor 805 with access to storage device 820.

Processor 805 executes computer-executable instructions for implementing aspects of the disclosure. In some embodiments, processor 805 may be transformed into a special purpose microprocessor by executing computer-executable instructions or by otherwise being programmed. For example, processor 805 may be programmed with the instructions such as are illustrated in FIG. 9.

Figure 9:
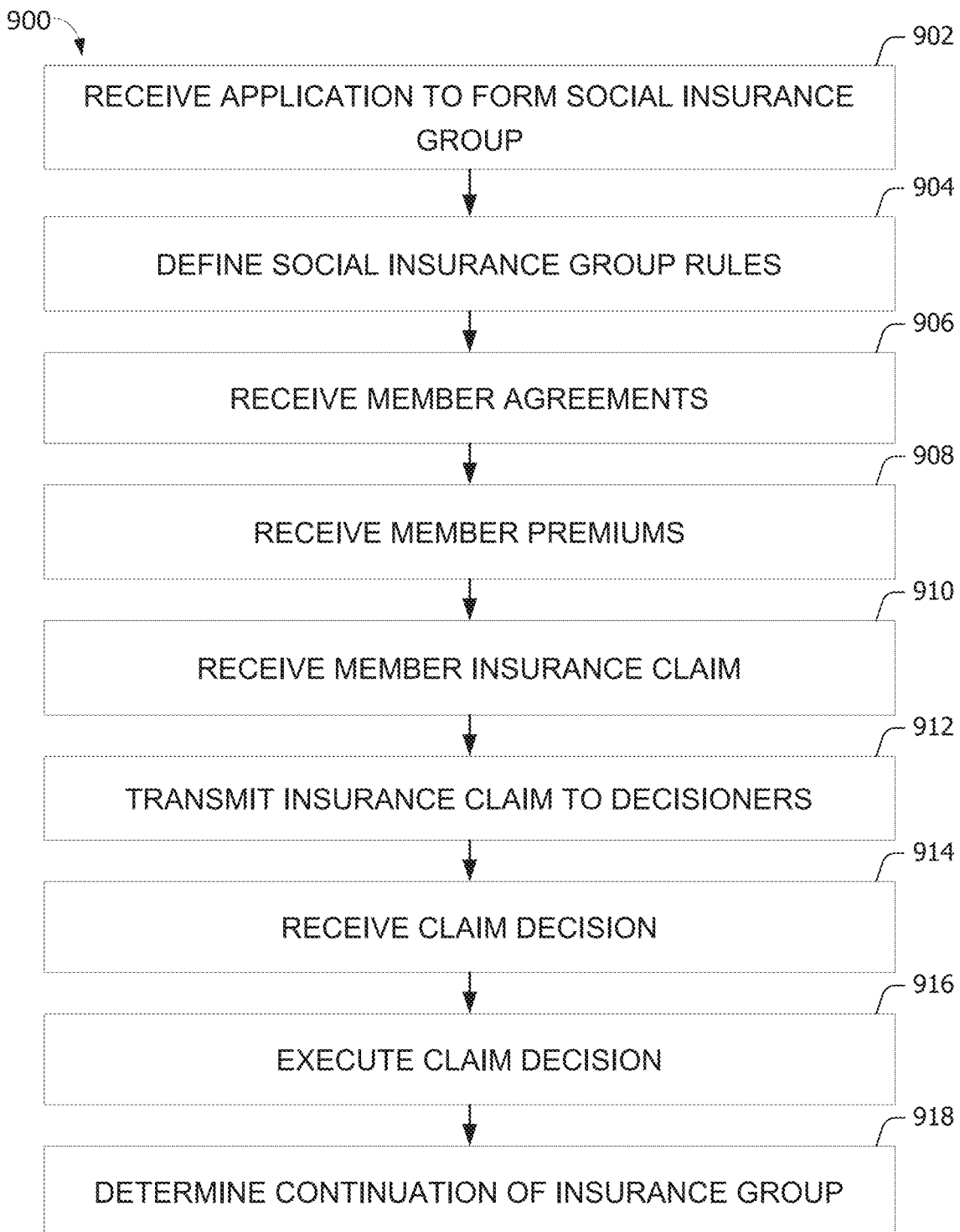
FIG. 9 illustrates a flow chart of an exemplary computer-implemented method for the exemplary social insurance group system shown in FIG. 1.

Exemplary Computer-Implemented Method for Establishing and Operating a Social Insurance System FIG. 9 depicts a flow chart of an exemplary computer-implemented method 900 for establishing and operating a social insurance group system 100 shown in FIG. 1. In the exemplary embodiment, method 900 may be performed by social insurance computing device 406 (shown in FIG. 4).

Method 900 may include receiving 902 an application to form a social insurance group, defining 904 the social insurance group rules, receiving 906 member agreements, receiving 908 member premiums, receiving 910 member insurance claims, and transmitting 912 the insurance claim to decisioners. In the exemplary embodiment, decisioners may be members of the social insurance group. Method 900 additionally includes receiving 914 a claim decision from the decisioners, and executing 916 the claim decision. Execution 916 of the claim decision may include withdrawing funds from an escrow account containing received 908 premiums and/or denying all or part of the claim. Method 900 additionally includes determining 918 whether to continue the social insurance group or to disband the group. The method may include additional, less, or alternate actions, including those discussed elsewhere herein.

Exemplary Computer Device

Figure 10:
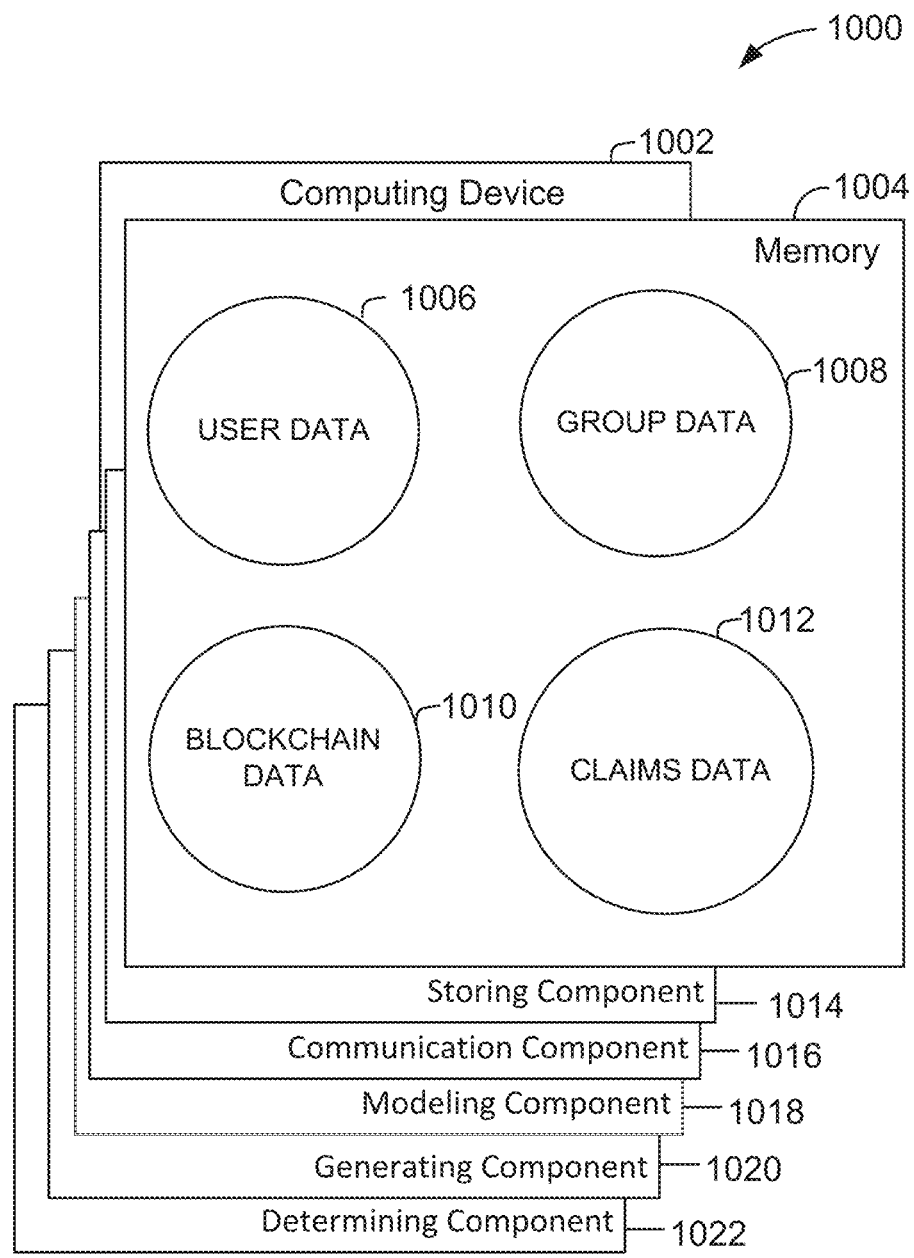
FIG. 10 illustrates a diagram of components of one or more exemplary computing devices that may be used in the system shown in FIG. 6.

FIG. 10 illustrates a diagram of components 1000 of one or more exemplary computing devices that may be used in the system shown in FIG. 1 and the system shown in FIG. 6. In some embodiments, computing device 1002 may be similar to social insurance computing device 406 shown in FIG. 4. Memory 1004 may be coupled with several separate components within computing device 1002, which perform specific tasks. In this embodiment, memory 1004 may include the user data 1006 (which may be similar to data stored in user database 408 shown in FIG. 4), group data 1008 (which may be similar to data associated with social insurance group 102 shown in FIG. 1), blockchain data 1010 (which may be similar to data stored in distributed blockchain ledger 302 shown in FIG. 3), and claims data 1012 (which may be similar to data submitted in an insurance claim 502 shown in FIG. 5).

Computing device 1002 may include memory 1004 as well as a storing component 1014. Computing device 1002 may also include a communication component 1016 for receiving user data 1006, group data 1008, blockchain data 1010, and/or claims data 1012, and transmitting data requested or distributing benefits. Computing device 1002 may also include a modeling component 1018 for modeling group and/or member predictive profiles. Computing device 1002 may also include a generating component 1020 for generating new blockchains and/or blocks in a blockchain for transactions. Computing device 1002 may also include a determining component 1022 for determining whether a social insurance group is to be continued after distribution of benefits.

Exemplary Embodiments & Functionality

In one aspect, a computer-implemented method for providing social insurance is provided. The method may be implemented using a blockchain-based social insurance ("BBSI") computing device including at least one processor in communication with at least one memory. The method may include: (i) receiving social insurance group data; (ii) defining at least one rule for the social insurance group based upon the social insurance group data; (iii) generating at least one social insurance group blockchain including the at least one rule; (iv) transmitting the at least one social insurance group blockchain to at least one member; and/or (v) receiving at least one member agreement blockchain from the at least one member. The method may include additional, less, or alternate actions, including those discussed elsewhere herein.

A further enhancement may be where the method further includes receiving a blockchain-based premium from at least one member of a social insurance group and stores the blockchain-based premium in a digital wallet. A further enhancement may be where the method further includes determining whether to continue the social insurance group, where the determination is based upon at least the at least one rule. A further enhancement may be where the method further includes generating a new block in a blockchain indicating the dissolution of the social insurance group and transfer remaining premiums to the at least one member upon the determination that the social insurance group is to be terminated. A further enhancement may be where the method further includes at least receiving a dissolution decision from the at least one member.

A further enhancement may be where the method further includes receiving a member insurance claim, transmitting the insurance claim to at least one member of the social insurance group, receiving an insurance claim decision; and executing the insurance claim decision. A further enhancement may be where the method further includes transmitting by using a blockchain, where the blockchain includes at least claim data. A further enhancement may be where the method further includes generating a committee comprising a plurality of members, where the plurality of members are randomly selected from the at least one member.

A further enhancement may be where the method further includes receiving an application to join the social insurance group, where the application is a block in a blockchain structure. The block may include at least social insurance group data identifying the social insurance group and member data associated with a user applying to join the social insurance group.

A further enhancement may be where the set of rules includes at least a termination date for the social insurance group. A further enhancement may be where the set of rules includes at least one of a minimum premium, a maximum premium, a maximum claim payout, a maximum number of members, and a social requirement for membership.

In another aspect, a blockchain-based social insurance ("BBSI") computer system for executing a claim in a social insurance group is provided. The BB SI computer system includes at least one processor in communication with at least one memory device. The at least one processor is programmed to: (i) store social insurance group data; (ii) define at least one qualifying rule for joining the social insurance group based upon the social insurance group data, wherein each member of the social insurance group must satisfy the at least one qualifying rule to become a member of the social insurance group; (iii) generate at least one social insurance group blockchain including the at least one qualifying rule for at least one member of the social insurance group; (iv) cause to be displayed on a user device an insurance claim; (v) receive, from the user device an insurance claim decision; and (vi) execute the insurance claim decision.

A further enhancement includes the BB SI computer system having a processor that is further programmed to: receive a blockchain-based premium from at least one member of a social insurance group; and store the blockchain-based premium in a digital wallet.

A further enhancement includes the BBSI computer system having a processor that is further programmed to determine whether to continue the social insurance group, wherein the determination is based upon at least the at least one rule.

A further enhancement includes the BBSI computer system having a processor that is further programmed to generate a new block in a blockchain indicating a dissolution of the social insurance group; and transfer remaining premiums to the at least one member upon the determination that the social insurance group is to be terminated.

A further enhancement includes the BBSI computer system, wherein the determination includes at least receiving a dissolution decision from the at least one member.

A further enhancement includes the BBSI computer system having a processor that is further programmed to: receive social insurance group data; define at least one qualifying rule for joining the social insurance group based upon the social insurance group data, wherein each member of the social insurance group must satisfy the at least one qualifying rule to become a member of the social insurance group; generate at least one social insurance group blockchain including the at least one qualifying rule; cause to be displayed on a user device the social insurance group data including the at least one qualifying rule for review by a candidate member; and receive, from the user device, a registration message from the candidate member, the registration message including a request for the candidate member to become a member of the group.

A further enhancement includes the BBSI computer system, wherein the claim is transmitted by using a blockchain, and wherein the blockchain includes at least claim data.

A further enhancement includes the BBSI computer system having a processor that is further programmed to generate a committee comprising a plurality of members, wherein the plurality of members are randomly selected from the at least one member.

A further enhancement includes the BBSI computer system having a processor that is further programmed to receive an application to join the social insurance group, wherein the application is a block in a blockchain structure, the block including at least social insurance group data identifying the social insurance group and member data associated with a user applying to join the social insurance group.

A further enhancement includes the BBSI computer system having a processor that is further programmed to define a plurality of rules, wherein at least one rule of the plurality of rules includes at least a termination date for the social insurance group.

A further enhancement includes the BBSI computer system, wherein the at least one qualifying rule is one of a minimum premium, a maximum premium, a maximum claim payout, a maximum number of members, and a social requirement for membership.

In another aspect, a computer-implemented method for providing social insurance is provided. The method is implemented using a blockchain-based social insurance ("BBSI") computing device that includes at least one processor in communication with at least one memory. The method comprises: (i) storing social insurance group data; (ii) defining at least one qualifying rule for joining the social insurance group based upon the social insurance group data, wherein each member of the social insurance group must satisfy the at least one qualifying rule to become a member of the social insurance group; (iii) generating at least one social insurance group blockchain including the at least one qualifying rule for at least one member of the social insurance group; (iv) causing to be displayed on a user device an insurance claim; (v) receiving, from the user device an insurance claim decision; and (vi) executing the insurance claim decision.

A further enhancement of the computer-implemented method for providing social insurance that further includes receiving a blockchain-based premium from at least one member of a social insurance group; and storing the blockchain-based premium in a digital wallet.

A further enhancement of the computer-implemented method for providing social insurance that further includes determining whether to continue the social insurance group, wherein the determination is based upon the at least one rule.

A further enhancement of the computer-implemented method for providing social insurance that further includes generating a new block in a blockchain indicating a dissolution of the social insurance group; and transferring remaining premiums to the at least one member upon the determination that the social insurance group is to be terminated.

In another aspect, at least one non-transitory computer-readable media having computer-executable instructions thereon is provided. Wherein when the instructions are executed by at least one processor of a BBSI computing device, cause the at least one processor of the BBSI computing device to: (i) store social insurance group data; (ii) define at least one qualifying rule for joining the social insurance group based upon the social insurance group data, wherein each member of the social insurance group must satisfy the at least one qualifying rule to become a member of the social insurance group; (iii) generate at least one social insurance group blockchain including the at least one qualifying rule for at least one member of the social insurance group; (iv) cause to be displayed on a user device an insurance claim; (v) receive, from the user device an insurance claim decision; and (vi) execute the insurance claim decision.

A further enhancement of the same computer-readable media, wherein the computer-executable instructions further cause the at least one processor to receive a blockchain-based premium from at least one member of a social insurance group; and store the blockchain-based premium in a digital wallet.

A further enhancement of the same computer-readable media, wherein the computer-executable instructions further cause the at least one processor to determine whether to continue the social insurance group, and wherein the determination is based upon at least the at least one rule.

A further enhancement of the same computer-readable media, wherein the computer-executable instructions further cause the at least one processor to generate a new block in a blockchain indicating a dissolution of the social insurance group; and transfer remaining premiums to the at least one member upon the determination that the social insurance group is to be terminated.

A further enhancement of the same computer-readable media, wherein the computer-executable instructions further cause the at least one processor to receive social insurance group data; define at least one qualifying rule for joining the social insurance group based upon the social insurance group data, wherein each member of the social insurance group must satisfy the at least one qualifying rule to become a member of the social insurance group; generate at least one social insurance group blockchain including the at least one qualifying rule; cause to be displayed on a user device the social insurance group data including the at least one qualifying rule for review by a candidate member; and receive, from the user device, a registration message from the candidate member, the registration message including a request for the candidate member to become a member of the group.

In another aspect, a computer-implemented method of providing social group reciprocal microinsurance management is provided. The method includes (i) receiving, via one or more processors and/or transceivers (such as at a remote server associated with an insurance provider), a petition from a customer mobile device to start a social group of insureds; (ii) creating, via the one or more processors and/or associated transceivers (such as at the remote server associated with the insurance provider), the social group of insureds, which may include risk coverage decision(s), one or more models for premiums, premium escrow and collection, and/or blockchain creation and/or related infrastructure; (iii) once the social group is created, inviting, via one or more local or remote processors and/or transceivers, various participants, individuals, or "friends" to join or participate in the social group of insureds; (iv) creating, via one or more local or remote processors and/or transceivers, policy terms; and/or (v) receiving approval, via one or more local or remote processors and/or transceivers, of a charter approved by the social group of insureds to facilitate microinsurance management.

A further enhancement of the computer-implemented method for providing social group reciprocal microinsurance management includes receiving, via one or more local or remote processors and/or transceivers, premiums from each member or participant in the social group of insureds.

A further enhancement of the computer-implemented method for providing social group reciprocal microinsurance management includes starting, via one or more local or remote processors and/or transceivers, insurance coverage for the social group of insureds.

A further enhancement of the computer-implemented method for providing social group reciprocal microinsurance management includes receiving, via one or more local or remote processors and/or transceivers, a claim submission that acts as a claims trigger for a smart contract that commences the claim handling process and allows for the submission of claim-related documents and photos via a customer mobile device and via wireless communication or data transmission.

A further enhancement of the computer-implemented method for providing social group reciprocal microinsurance management includes receiving, via one or more local or remote processors and/or associated transceivers, votes from members of the insurance-related social group on claims resolution.

A further enhancement of the computer-implemented method for providing social group reciprocal microinsurance management includes electronically paying, via one or more local or remote processors and/or associated transceivers, all or part of the claim to an account associated with the insured.

A further enhancement of the computer-implemented method for providing social group reciprocal microinsurance management includes continuing, via one or more local or remote processors and/or associated transceivers, to direct and manage the insurance social group in accordance with the approval charter.

A further enhancement of the computer-implemented method for providing social group reciprocal microinsurance management includes monitoring, via one or more local or remote processors and/or associated transceivers, an escrow account associated with the insurance social group, and when the escrow account falls below a predetermined threshold, ending group coverage and returning corresponding portions of the remaining escrow account to accounts belonging to respective group members.

In another aspect, a computer system configured to provide social group reciprocal microinsurance management is provided. The computer system comprises one or more local or remote processors and/or associated transceivers configured to: (i) receive, via wireless communication or data transmission over one or more radio frequency links, a petition from a customer mobile device to start a social group of insureds; (ii) create the social group of insureds, which may include risk coverage decision(s), one or more models for premiums, premium escrow and collection, and/or blockchain creation and/or related infrastructure; (iii) once the social group is created, inviting, via wireless communication or data transmission over one or more radio frequency links, various participants, individuals, or "friends" to join or participate in the social group of insureds; (iv) create policy terms; and/or (v) receive approval, via wireless communication or data transmission over one or more radio frequency links, of a charter by the social group of insureds to facilitate microinsurance management.

A further enhancement of the computer system for providing social group reciprocal microinsurance management includes one or more processors and/or associated transceivers further configured to receive, via wireless communication or data transmission over one or more radio links, premiums from each member or participant in the social group of insureds.

A further enhancement of the computer system for providing social group reciprocal microinsurance management includes one or more processors and/or associated transceivers further configured to commence insurance coverage for the social group of insureds.

A further enhancement of the computer system for providing social group reciprocal microinsurance management includes one or more processors and/or associated transceivers further configured to receive, via wireless communication or data transmission over one or more radio links, a claim submission that acts as a claims trigger for a smart contract that commences the claim handling process, and allows for the submission of claim-related documents and photos via a customer mobile device and via wireless communication or data transmission.

A further enhancement of the computer system for providing social group reciprocal microinsurance management includes one or more processors and/or associated transceivers further configured to receive, via wireless communication or data transmission over one or more radio links, votes from members of the insurance-related social group on claims resolution.

A further enhancement of the computer system for providing social group reciprocal microinsurance management includes one or more processors and/or associated transceivers further configured to electronically pay, via wireless communication or data transmission over one or more radio links, all or part of the claim to an account associated with the insured.

A further enhancement of the computer system for providing social group reciprocal microinsurance management includes one or more processors and/or associated transceivers further configured once coverage goes into effect, continue to direct and manage the insurance social group in accordance with the approval charter.

A further enhancement of the computer system for providing social group reciprocal microinsurance management includes one or more processors and/or associated transceivers further configured to monitor an escrow account associated with the insurance social group, and when the escrow account falls below a predetermined threshold, ending group coverage and returning corresponding portions of the remaining escrow account to accounts belonging to respective group members.

Machine Learning & Other Matters

The computer-implemented methods discussed herein may include additional, less, or alternate actions, including those discussed elsewhere herein. The methods may be implemented via one or more local or remote processors, transceivers, servers, and/or sensors (such as processors, transceivers, servers, and/or sensors mounted on vehicles or mobile devices, or associated with smart infrastructure or remote servers), and/or via computer-executable instructions stored on non-transitory computer-readable media or medium.

Additionally, the computer systems discussed herein may include additional, less, or alternate functionality, including that discussed elsewhere herein. The computer systems discussed herein may include or be implemented via computer-executable instructions stored on non-transitory computer-readable media or medium.

A processor or a processing element may be trained using supervised or unsupervised machine learning, and the machine learning program may employ a neural network, which may be a convolutional neural network, a deep learning neural network, or a combined learning module or program that learns in two or more fields or areas of interest. Machine learning may involve identifying and recognizing patterns in existing data in order to facilitate making predictions for subsequent data. Models may be created based upon example inputs in order to make valid and reliable predictions for novel inputs.

Additionally or alternatively, the machine learning programs may be trained by inputting sample data sets or certain data into the programs, such as risk data, asset data, group data, and/or member data. The machine learning programs may utilize deep learning algorithms that may be primarily focused on pattern recognition, and may be trained after processing multiple examples. The machine learning programs may include Bayesian program learning (BPL), voice recognition and synthesis, image or object recognition, optical character recognition, and/or natural language processing—either individually or in combination. The machine learning programs may also include natural language processing, semantic analysis, automatic reasoning, and/or machine learning.

In supervised machine learning, a processing element may be provided with example inputs and their associated outputs, and may seek to discover a general rule that maps inputs to outputs, so that when subsequent novel inputs are provided the processing element may, based upon the discovered rule, accurately predict the correct output. In unsupervised machine learning, the processing element may be required to find its own structure in unlabeled example inputs. In one embodiment, machine learning techniques may be used to extract data about the social insurance group, the individual members including member behaviors, the characteristics of the assets insured and/or other data. In one embodiment, machine learning techniques may be used to generate models of the social insurance group and/or models of the members of the social insurance group.

The models may be used to generate varying risk assessments of the social insurance group and/or the individual members based upon different factors. For example, a generated model may receive input related to a certain time period and/or activity and/or expected event to determine a probable outcome and/or cost and/or premium to charge each member and/or candidate member joining the social insurance group.

Based upon these analyses, the processing element may learn how to identify characteristics and patterns that may then be applied to analyzing social group data, asset data, individual member data, and/or other data. For example, the processing element may learn, with the user's permission or affirmative consent, to predict suggestions for future social insurance groups for members to join. The processing element may also learn how to identify different types of problems and/or issues with social insurance groups to assist the members based upon claims processing and post disbandment details.

Exemplary Aspects

Many insurance claims are of little value and add to operating costs. A challenge exists in bringing in new customers at a low premium, having limited human interaction with these customers, and collecting a fee from customers, while giving customers a satisfactory, self-driven experience.

The systems and methods described herein involve providing a platform and ecosystem that allows self-organizing customer groups, usually those that have a social connection to minimize fraud and satisfy sufficient vetting, to insure themselves with a minimum of insurer interaction. The ecosystem, which may be provided by a large insurer, may allow small groups of socially connected people to form groups and act as a sort of (or actual) reciprocal insurance group, where the larger insurer would act as attorney-in-fact, perform automated underwriting/AI on groups and/or participants, collect premiums, and run the administrative and IT aspects of the insurance arrangements.

The insurance may be targeted for limited risks, such as "glass" and "deductible insurance" (insurance for the risks of having a claim and paying the deductible of $1,000+). There may be other risks that are identified that social groups may be insured for wherein the risks and terms are agreed to by each group.

After small groups are formed by pooling according to actuarial rules, the administration of the group may be handled by blockchain or blockchain-based or related functionality—such as blockchain functionality related to lump sum payments/premium recording, opt-in and collecting electronic signatures, and/or claims resolution—all via smart contracts triggered by key events (e.g., once all participants have paid in, the coverage may start or go into effect, for instance, and a verified claim may trigger the claims process).

The socially connected groups of insured customers may be incentivized by maintaining group quality and reducing fraud—the present embodiments may focus on attracting quality, known customers to your group, because participants receive most of the premium paid back (the insurance company acting as attorney-in-fact may collect a fee for running the ecosystem) if no or only a few claims are submitted for processing. An additional component of this ecosystem may be that the group participants validate the claims themselves, and kick off the claims resolution process by having some number of group members involved in that validation.

This disclosure proposes a computer system, method, and non-transient computer readable media as a platform for different groupings of people to form their own reciprocal insurance group. This may be done in conjunction with an entity such as an insurance provider, but also insure other risks not covered under traditional policies. The entity or insurance provider may act as attorney/agent for the group, in some embodiments.

The present embodiments may include several aspects and concepts, including (1) a reciprocal insurance concept for small social groups (participants may be either acquainted, or assigned to groups based upon algorithms or similar characteristics); (2) the insurance provider may provide attorney-in-fact type services of administration, premium collection, IT services, blockchain setup, and actuary and artificial intelligence modeling; and (3) blockchain based using smart contracts customized by the group, and triggered by events of group members—from coverage to claims resolution. In some embodiments, no human interaction is needed or offered for these accounts. Smart contracts may be triggered by participant interactions, from claims reporting to claims settling. The social groups may create and manage the terms of claims resolution (voting members may settle claims based upon rules they create or have modified from a set of default rules, for example).

Another aspect of the present embodiments may include (4) group members receiving most of the premium back if no claims occur. The insurance provider or other host entity may collect fees for running the ecosystem. Most coverage may not be at the usual threshold of typical coverage which represents a large market.

Another aspect of the present embodiments may include (5) if allowed by regulators, investing premiums by the larger insurer, as directed by the customers, or if by the insurer if preferred to allow premium growth during the coverage period. The insurer may leverage its investment mechanisms and experience. Any profits may come back to the policyholders.

Another aspect of the present embodiments may include (6) an API that may allow for any small risk/claim amount coverage for a social group. For example, wine enthusiasts may insure their collection against spoilage; homeowners with water features may insure themselves on a limited basis for freezing and breakage of equipment or piping during the winter months; and/or biking club members could insure their bikes during a training season. All of these claims may be under a typical deductible amount from the insurer.

In other aspects of the present embodiments, (7) group participants may receive their premiums back if unused, minus an administration fee by the insurer; and (8) this service may also be used as "deductible insurance," and a method of attracting customers (even the deductible amount can be insured).

A large insurer may tap into their actuarial and other risk models, AI, policy administration (premium collection and rebates, customer communication), targeted marketing, etc. to operate as sort of an attorney-in-fact to smaller insured pools operating as reciprocal insurance groups. The reciprocal groups may be small to medium size, such as a few as 10 members, or as many as thousands. These reciprocal groups may share some social relationships, such as trade, church, or other interest groups and may ideally know/trust each other. Alternately, potential customers may opt-in to be assigned to a group based upon insurance company models. A mechanism may be in place to allow the group to approve new members.

Customers may apply to start a social insurance group, then invite and approve/vote in others to be in this group. Theoretically, the more socially connected a group is, the less likelihood for fraud (social pressure not to defraud members of your social group, and pre-vetted customer ethics via the invitation/approval aspect of the group). Customers may then define the insured risk for microinsurance (for example, "deductible insurance of up to $1,000 for auto collision"), any terms surrounding the policy (voting quorum for claims settling, what happens to the funds at the end of the policy term, what happens to claimants and the group after a claim is made, minimum premiums paid, coverage amounts, etc.).

Once a group is formed or customers are assigned to a group via machine learning/AI models, other aspects of the social microinsurance policy may be written into the blockchain, with details entered in smart contracts. The insurance coverage may then start when the insurer receives all premiums necessary, and this could trigger a smart contract event to begin coverage. A claim may trigger another smart contract to start the claim handling process, and members could vote on settling the claim.

Exemplary Microinsurance Management

Figure 11:
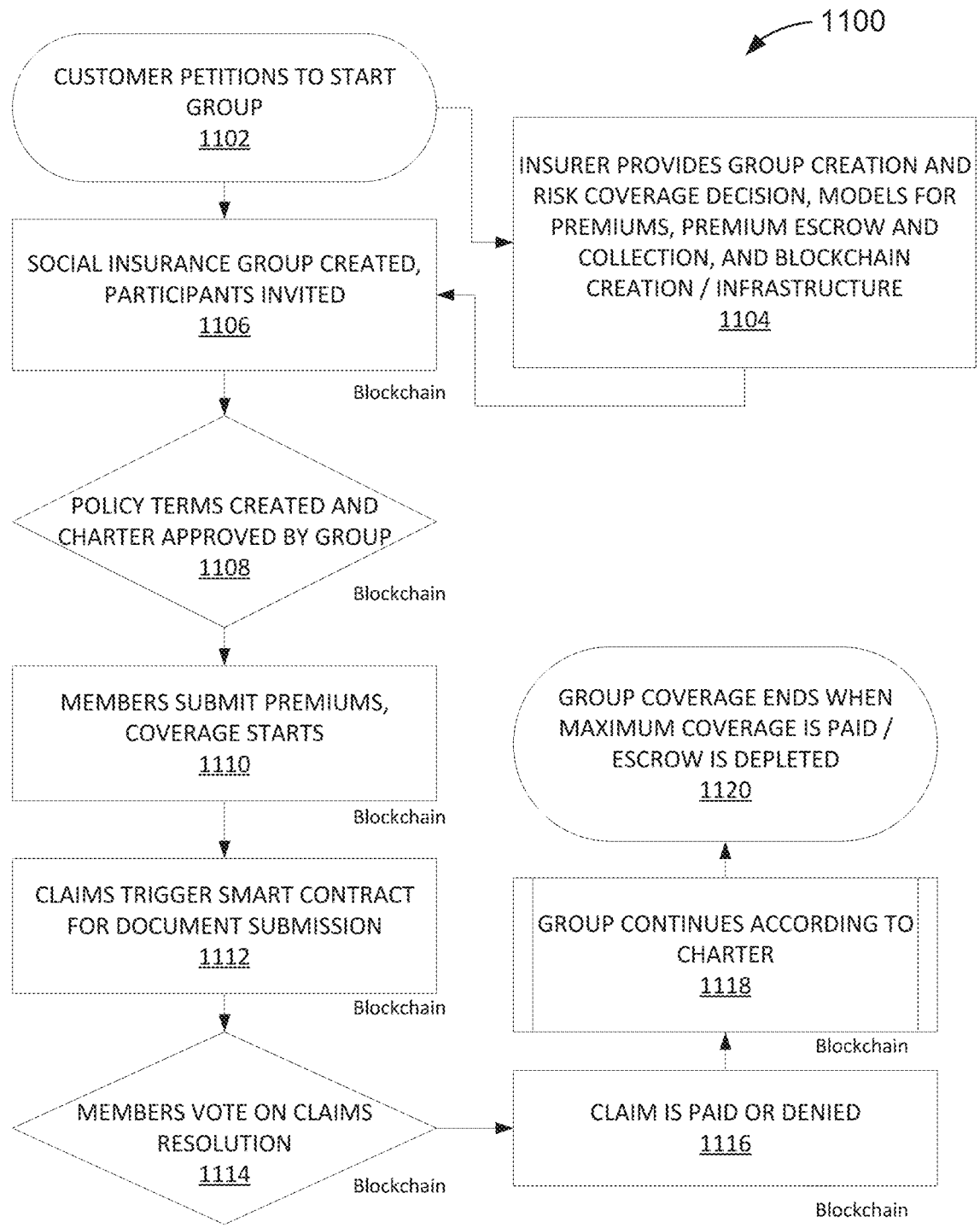
FIG. 11 illustrates a flow chart of an exemplary computer-implemented method for managing reciprocal microinsurance among a social group using the systems described herein.

FIG. 11 illustrates a flow chart of an exemplary computer-implemented method 1100 for managing reciprocal microinsurance among a social group using the systems described herein.

The computer-implemented method 1100 may include, via one or more processors and/or associated transceivers, one or more customers petitioning electronically to start a social insurance group 1102. For instance, a customer may access an App (e.g., a computer app) on their mobile device, and press a dedicated icon on a website that sends a request to form a new social insurance group, via wireless communication or data transfer, to a remote server, such as a remote server associated with an insurance provider.

The method 1100 may include the remote server and/or the insurance provider providing, via one or more processors and/or associated transceivers, social insurance group creation and risk coverage decision making, models for premiums and discounts, means for premium escrow and collection, and blockchain creation and infrastructure support/set-up 1104.

The method 1100 may include, once the social insurance group has been created and/or established, via one or more processors and/or associated transceivers, inviting participants to join the social insurance group 1106. For instance, the customer that created the group, may invite his or her social media "friends", or other friends, colleagues, or family members to join the group, such as via social media invites and/or wireless communication or data transfer using mobile devices.

The method 1100 may include, via one or more processors and/or associated transceivers and/or wireless communication between and among mobile devices belonging to the group, the group creating policy terms and approving a charter 1108.

The method 1100 may include, via one or more processors and/or associated transceivers, members of the group submitting payments or electronic payments via their mobile devices, and the insurance coverage commencing 1110.

The method 1100 may include, via one or more processors and/or associated transceivers, receiving electronic claims from the group, such as via wireless communication or data transmission using their mobile devices. The method 1100 may include, via one or more processors and/or associated transceivers, any received claim triggering 1112 a smart contract for document submission, such as document submission onto a block of, or a link to, a blockchain.

The method 1100 may include, via one or more processors and/or associated transceivers, members voting on claims resolution 1114. For instance, each member of the group, or each voting member of the group, may vote on claim resolution via wireless communication or data transmission using their mobile device (or other computing device).

The method 1100 may include, via one or more processors and/or associated transceivers, making an electronic payment to an account of the insured to pay the claim, and/or sending an electronic notification to the insured informing them of the claim resolution, such as part or all of the claim being paid or denied 1116.

The method 1100 may include, via one or more processors and/or associated transceivers, continuing to administer and run the group according to the approved charter 1118.

The method 1100 may include, via one or more processors and/or associated transceivers, ending group coverage when the maximum coverage is paid and/or the escrow has been depleted 1120. The method 1100 may include additional, less, or alternate actions, including those discussed elsewhere herein.

Exemplary Insurance Social Group Formation & Management

In one aspect, a computer-implemented method of providing social group reciprocal microinsurance management may be provided. The method may include (1) receiving, via one or more processors and/or associated transceivers (such as at a remote server associated with an insurance provider), a petition from a customer mobile device to start a social group of insureds; (2) creating, via the one or more processors and/or transceivers (such as at the remote server associated with the insurance provider), the social group of insureds, which may include risk coverage decision(s), one or more models for premiums, premium escrow and collection, and/or blockchain creation and/or related infrastructure; (3) once the social group is created, inviting, via one or more local or remote processors and/or transceivers, various participants, individuals, or "friends" to join or participate in the social group of insureds; (4) creating, via one or more local or remote processors and/or transceivers, policy terms; and/or (5) receiving approval, via one or more local or remote processors and/or transceivers, of a charter approved by the social group of insureds to facilitate microinsurance management.

The method may include (6) receiving, via one or more local or remote processors and/or transceivers, premiums from each member or participant in the social group of insureds, and/or (7) starting, via one or more local or remote processors and/or transceivers, insurance coverage for the social group of insureds. The method may also include (8) receiving, via one or more local or remote processors and/or transceivers, a claim submission that acts as a claims trigger for a smart contract that commences the claim handling process and allows for the submission of claim-related documents and photos via a customer mobile device and via wireless communication or data transmission; and/or (9) receiving, via one or more local or remote processors and/or associated transceivers, votes from members of the insurance-related social group on claims resolution.

The method may include (10) electronically paying, via one or more local or remote processors and/or associated transceivers, all or part of the claim to an account associated with the insured. The method may also include (11) continuing, via one or more local or remote processors and/or associated transceivers, to direct and manage the insurance social group in accordance with the approval charter. The method may further include (12) monitoring, via one or more local or remote processors and/or associated transceivers, an escrow account associated with the insurance social group, and/or (13) when the escrow account falls below a predetermined threshold, ending group coverage and returning corresponding portions of the remaining escrow account to accounts belonging to respective group members. The method may include additional, less, or alternate actions, including those discussed elsewhere herein.

In another aspect, a computer system configured to provide social group reciprocal microinsurance management may be provided. The computer system may include one or more local or remote processors and/or associated transceivers configured to: (1) receive, via wireless communication or data transmission over one or more radio frequency links, a petition from a customer mobile device to start a social group of insureds; (2) create the social group of insureds, which may include risk coverage decision(s), one or more models for premiums, premium escrow and collection, and/or blockchain creation and/or related infrastructure; (3) once the social group is created, inviting, via wireless communication or data transmission over one or more radio frequency links, various participants, individuals, or "friends" to join or participate in the social group of insureds; (4) create policy terms; and/or (5) receive approval, via wireless communication or data transmission over one or more radio frequency links, of a charter by the social group of insureds to facilitate microinsurance management.

The computer system and/or the one or more local processors and/or associated transceivers may be further configured to (6) receive, via wireless communication or data transmission over one or more radio links, premiums from each member or participant in the social group of insureds; (7) commence insurance coverage for the social group of insureds; (8) receive, via wireless communication or data transmission over one or more radio links, a claim submission that acts as a claims trigger for a smart contract that commences the claim handling process, and allows for the submission of claim-related documents and photos via a customer mobile device and via wireless communication or data transmission; (9) receive, via wireless communication or data transmission over one or more radio links, votes from members of the insurance-related social group on claims resolution; (10) electronically pay, via wireless communication or data transmission over one or more radio links, all or part of the claim to an account associated with the insured; (11) once coverage goes into effect, continue to direct and manage the insurance social group in accordance with the approval charter; and/or (12) monitor an escrow account associated with the insurance social group, and/or when the escrow account falls below a predetermined threshold, ending group coverage and returning corresponding portions of the remaining escrow account to accounts belonging to respective group members.

The computer system and/or the one or more processors and/or associated transceivers may be configured to perform additional, less, or alternate functionality, including that discussed elsewhere herein.

ADDITIONAL CONSIDERATIONS

With the foregoing, an insurance customer may opt-in to a social insurance group or other type of program. After the insurance customer provides their affirmative consent, an insurance provider remote server may collect data from the member's mobile device, user computing device, or, if the asset includes a computing device (e.g., a smart vehicle, autonomous or semi-autonomous vehicle, smart home controller, or other smart devices)—such as with the customer's permission or affirmative consent. The data collected may be related to social insurance group activity and/or individual member activity for insured assets before (and/or after) an insurance-related event, including those events discussed elsewhere herein.

As will be appreciated based upon the foregoing specification, the above-described embodiments of the disclosure may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the discussed embodiments of the disclosure. The computer-readable media may be, for example, but is not limited to, a fixed (hard) drive, diskette, optical disk, magnetic tape, semiconductor memory such as read-only memory (ROM), and/or any transmitting/receiving medium such as the Internet or other communication network or link. The article of manufacture containing the computer code may be made and/or used by executing the code directly from one medium, by copying the code from one medium to another medium, or by transmitting the code over a network.

These computer programs (also known as programs, software, software applications, "apps", or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The "machine-readable medium" and "computer-readable medium," however, do not include transitory signals. The term "machine-readable signal" refers to any signal used to provide machine instructions and/or data to a programmable processor.

As used herein, a processor may include any programmable system including systems using micro-controllers, reduced instruction set circuits (RISC), application specific integrated circuits (ASICs), logic circuits, and any other circuit or processor capable of executing the functions described herein. The above examples are example only, and are thus not intended to limit in any way the definition and/or meaning of the term "processor."

As used herein, the terms "software" and "firmware" are interchangeable, and include any computer program stored in memory for execution by a processor, including RAM memory, ROM memory, EPROM memory, EEPROM memory, and non-volatile RAM (NVRAM) memory. The above memory types are example only, and are thus not limiting as to the types of memory usable for storage of a computer program.

In one embodiment, a computer program is provided, and the program is embodied on a computer readable medium. In an exemplary embodiment, the system is executed on a single computer system, without requiring a connection to a sever computer. In a further embodiment, the system is being run in a Windows® environment (Windows is a registered trademark of Microsoft Corporation, Redmond, Wash.). In yet another embodiment, the system is run on a mainframe environment and a UNIX® server environment (UNIX is a registered trademark of X/Open Company Limited located in Reading, Berkshire, United Kingdom). The application is flexible and designed to run in various different environments without compromising any major functionality. In some embodiments, the system includes multiple components distributed among a plurality of computing devices. One or more components may be in the form of computer-executable instructions embodied in a computer-readable medium. The systems and processes are not limited to the specific embodiments described herein. In addition, components of each system and each process can be practiced independent and separate from other components and processes described herein. Each component and process can also be used in combination with other assembly packages and processes.

In some embodiments, registration of users for the social insurance group includes opt-in informed consent of users to data usage by the interactive 3D image projection system consistent with consumer protection laws and privacy regulations. In some embodiments, the enrollment data and/or other collected data may be anonymized and/or aggregated prior to receipt such that no personally identifiable information (PII) is received. In other embodiments, the system may be configured to receive application data and/or other collected data that is not yet anonymized and/or aggregated, and thus may be configured to anonymize and aggregate the data. In such embodiments, any PII received by the system is received and processed in an encrypted format, or is received with the consent of the individual with which the PII is associated. In situations in which the systems discussed herein collect personal information about individuals, or may make use of such personal information, the individuals may be provided with an opportunity to control whether such information is collected or to control whether and/or how such information is used. In addition, certain data may be processed in one or more ways before it is stored or used, so that personally identifiable information is removed.

As used herein, an element or step recited in the singular and proceeded with the word "a" or "an" should be understood as not excluding plural elements or steps, unless such exclusion is explicitly recited. Furthermore, references to "exemplary embodiment" or "one embodiment" of the present disclosure are not intended to be interpreted as excluding the existence of additional embodiments that also incorporate the recited features.

The patent claims at the end of this document are not intended to be construed under 35 U.S.C. § 112(f) unless traditional means-plus-function language is expressly recited, such as "means for" or "step for" language being expressly recited in the claim(s).

This written description uses examples to disclose the disclosure, including the best mode, and also to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

I claim:

1. A blockchain-based social insurance ("BBSI") computer system for creating a social insurance group, the BBSI computer system including at least one processor in communication with at least one memory device, the at least one processor is programmed to:
   receive social insurance group data;
   define at least one qualifying rule for joining the social insurance group based upon the social insurance group data, wherein each member of the social insurance group must satisfy the at least one qualifying rule to become a member of the social insurance group, and wherein the at least one qualifying rule includes at least one requirement designated by at least one founding member of the social insurance group at a time the social insurance group was formed;
   generate at least one social insurance group blockchain including the at least one qualifying rule and at least one smart contract, the at least one smart contract customizable by one or more members of the social insurance group and generated based upon the at least one qualifying rule;
   cause to be displayed on a user device the social insurance group data including the at least one qualifying rule for review by a candidate member; and
   receive, from the user device, a registration message from the candidate member, the registration message including a request for the candidate member to become a new member of the social insurance group.

2. The BBSI computer system of claim 1, wherein the processor is further programmed to apply the at least one qualifying rule in the at least one social insurance group blockchain to the registration message to determine whether to grant the request.

3. The BBSI computer system of claim 1, wherein the processor is further programmed to generate a new block in the at least one social insurance group blockchain including the registration message.

4. The BBSI computer system of claim 1, wherein the processor is further programmed to:
   receive a blockchain-based premium from at least one member of the social insurance group; and
   store the blockchain-based premium in a digital wallet.

5. The BBSI computer system of claim 4, wherein the at least one processor is further programmed to determine whether to continue the social insurance group, wherein the determination is based upon at least the at least one qualifying rule.

6. The BBSI computer system of claim 5, wherein the at least one processor is further programmed to:
   generate a new block in a blockchain indicating a dissolution of the social insurance group; and
   transfer remaining premiums to the at least one member upon the determination that the social insurance group is to be terminated.

7. The BBSI computer system of claim 5, wherein the determination includes at least receiving a dissolution decision from the at least one member.

8. The BBSI computer system of claim 1, wherein the processor is further programmed to:
   receive a member insurance claim;
   transmit the member insurance claim to at least one member of the social insurance group;
   receive an insurance claim decision; and
   execute the insurance claim decision.

9. The BBSI computer system of claim 8, wherein the member insurance claim is transmitted by using a blockchain, wherein the blockchain includes at least claim data.

10. The BBSI computer system of claim 8, wherein the processor is further programmed to generate a committee comprising a plurality of members, wherein the plurality of members are randomly selected from the at least one member.

11. The BBSI computer system of claim 1, wherein the processor is further programmed to receive an application to join the social insurance group, wherein the application is a block in a blockchain structure, the block including at least the social insurance group data identifying the social insurance group and member data associated with a user applying to join the social insurance group.

12. The BBSI computer system of claim 1, wherein the processor is further programmed to define a plurality of rules, wherein at least one rule of the plurality of rules includes at least a termination date for the social insurance group.

13. The BBSI computer system of claim 1, wherein the at least one qualifying rule is one of a minimum premium, a maximum premium, a maximum claim payout, a maximum number of members, and a social requirement for membership.

14. A computer-implemented method for providing social insurance, the method implemented using a blockchain-based social insurance ("BBSI") computing device including at least one processor in communication with at least one memory, the method comprising:
   receiving social insurance group data;
   defining at least one rule for joining a social insurance group based upon the social insurance group data, and wherein the at least one qualifying rule includes at least one requirement designated by at least one founding member of the social insurance group at a time the social insurance group was formed;
   generating at least one social insurance group blockchain including the at least one rule and at least one smart contract, the at least one smart contract customizable by one or more members of the social insurance group and generated based upon the at least one qualifying rule;

transmitting the at least one social insurance group blockchain to at least one member; and receiving at least one member agreement blockchain from the at least one member.

15. The computer-implemented method of claim 14 further comprising:

receiving a blockchain-based premium from at least one member of the social insurance group; and storing the blockchain-based premium in a digital wallet.

16. The computer-implemented method of claim 14 further comprising determining whether to continue the social insurance group, wherein the determination is based upon at least the at least one rule.

17. The computer-implemented method of claim 14 further comprising:

generating a new block in a blockchain indicating a dissolution of the social insurance group; and transferring remaining premiums to each member of the social insurance group on the determination that the social insurance group is to be terminated.

18. The computer-implemented method of claim 14 further comprising:

receiving a member insurance claim;

transmitting the member insurance claim to at least one member of the social insurance group;

receiving an insurance claim decision; and executing the insurance claim decision.

19. A least one non-transitory computer-readable medium having computer-executable instructions thereon, wherein when executed by at least one processor of a blockchain-based social insurance (BBSI) computing device, cause the at least one processor of the BBSI computing device to:

receive social insurance group data;

define at least one qualifying rule for joining a social insurance group based upon the social insurance group data, wherein each member of the social insurance group must satisfy the at least one qualifying rule to become a member of the social insurance group, and wherein the at least one qualifying rule includes at least one requirement designated by at least one founding member of the social insurance group at a time the social insurance group was formed;

generate at least one social insurance group blockchain including the at least one qualifying rule and at least one smart contract, the at least one smart contract customizable by one or more members of the social insurance group and generated based upon the at least one qualifying rule;

cause to be displayed on a user device the social insurance group data including the at least one qualifying rule for review by a candidate member; and receive, from the user device, a registration message from the candidate member, the registration message including a request for the candidate member to become a new member of the social insurance group.

20. The computer-readable medium of claim 19, wherein the computer-executable instructions further cause the at least one processor to:

receive a blockchain-based premium from at least one member of the social insurance group; and store the blockchain-based premium in a digital wallet.

* * * * *